United States Patent
Wu et al.

(10) Patent No.: US 12,550,016 B2
(45) Date of Patent: Feb. 10, 2026

(54) CONDITIONAL OPERATIONS WITH A SUSPENDED RADIO CONNECTION

(71) Applicant: GOOGLE LLC, Mountain View, CA (US)

(72) Inventors: Chih-Hsiang Wu, Taoyuan (TW); Teming Chen, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 553 days.

(21) Appl. No.: 17/775,264

(22) PCT Filed: Nov. 6, 2020

(86) PCT No.: PCT/US2020/059350
§ 371 (c)(1),
(2) Date: May 6, 2022

(87) PCT Pub. No.: WO2021/092337
PCT Pub. Date: May 14, 2021

(65) Prior Publication Data
US 2022/0394572 A1    Dec. 8, 2022

Related U.S. Application Data

(60) Provisional application No. 62/974,043, filed on Nov. 7, 2019.

(51) Int. Cl.
*H04W 36/00* (2009.01)
*H04W 36/08* (2009.01)
*H04W 36/36* (2009.01)

(52) U.S. Cl.
CPC ..... *H04W 36/0069* (2018.08); *H04W 36/00222* (2023.05); *H04W 36/08* (2013.01); *H04W 36/362* (2023.05)

(58) Field of Classification Search
CPC .................. H04W 36/0069; H04W 36/08
See application file for complete search history.

(56) References Cited

U.S. PATENT DOCUMENTS

2018/0279193 A1   9/2018  Park et al.
2019/0223073 A1   7/2019  Chen et al.
(Continued)

FOREIGN PATENT DOCUMENTS

CN    110149664 A     8/2019
EP    3 562 209 A1    10/2019
(Continued)

OTHER PUBLICATIONS

Ericsson, "Suspend while monitoring CHO in NR", 3GPP TSG-RAN WG2 #107, Prague, Czech Republic, Aug. 26-30, 2019, RS-1909335 (Year: 2019).*
3GPP TS 37.340 V15.7.0 (Sep. 2019), Technical Specification, 3rd Generation Partnership Project; Technical Specification Group Radio Access Network; Evolved Universal Terrestrial Radio Access (E-UTRA) and NR; Multi-connectivity; Stage 2 (Release 15) (Year: 2019).*
China Telecom, "Running CR for Introduction of Even Further Mobility Enhancement in E-Utran," 3GPP Draft (2019).
(Continued)

*Primary Examiner* — Joseph A Bednash
(74) *Attorney, Agent, or Firm* — MARSHALL, GERSTEIN & BORUN LLP

(57) ABSTRACT

A method in a first base station for managing a conditional operation related to a user equipment UE includes sending, by processing hardware to the UE, a conditional connection information including at least one of a (i) configuration data related to a second base station in order for the UE to operate in dual connectivity with the first base station and the second base station, or (ii) one or more conditions connecting to the second base station (2202). The method also includes, in response to determining, by the processing hardware, that the UE is to suspend a radio connection with the first base station (2204): causing the UE to suspend a radio connection with the first base station (2206), and causing the second base station to release the conditional connection information (2208).

20 Claims, 21 Drawing Sheets

(56) References Cited

U.S. PATENT DOCUMENTS

| | | | |
|---|---|---|---|
| 2020/0022035 A1 | 1/2020 | Kadiri et al. | |
| 2020/0154321 A1 | 5/2020 | Kang et al. | |
| 2020/0396662 A1* | 12/2020 | Wu | H04W 24/10 |
| 2022/0141904 A1* | 5/2022 | Yilmaz | H04L 5/0035 |
| | | | 370/329 |
| 2022/0295366 A1* | 9/2022 | Teyeb | H04W 36/00692 |
| 2023/0007553 A1* | 1/2023 | Rugeland | H04W 36/00837 |

FOREIGN PATENT DOCUMENTS

| | | |
|---|---|---|
| WO | WO-2016/138937 A1 | 9/2016 |
| WO | WO-2019/134163 A1 | 7/2019 |
| WO | WO-2019/161741 A1 | 8/2019 |
| WO | WO-2020/065622 A1 | 4/2020 |
| WO | WO-2020/128966 A1 | 6/2020 |

OTHER PUBLICATIONS

Ericsson, "Suspend While Monitoring CHO in NR," 3GPP Draft (2019).

Huawei, "(TP for LTE_feMob BL CR for TS 36.423): Handover Modification for CHO," 3GPP Draft (2019).

International Search Report and Written Opinion for Application No. PCT/US2020/059350, dated Feb. 12, 2021.

First Office Action for Chinese Application No. 202080091611.5, dated Sep. 14, 2024.

Intel Corporation, "New WID: NR Mobility Enhancements," 3GPP Tsg Ran Meeting #83 (RP-190489), Shenzhen, China, (Mar. 18-21, 2019).

ETSI TS 136 300 V14.20 (Apr. 2017), Section 6.5, "Dual Connectivity," pp. 81-82.

* cited by examiner

CONDITIONAL OPERATIONS WITH A SUSPENDED RADIO CONNECTION

This disclosure relates generally to wireless communications and, more particularly, to conditional procedures such as conditional handover and conditional secondary node addition procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

3GPP specification TS 37.340 (v15.7.0) describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These procedures, which do not involve conditions that are checked at the UE, can be referred to as "immediate" SN addition and SN change procedures.

UEs can also perform handover procedures to switch from one cell to another, whether in single connectivity (SC) or DC operation. The UE may handover from a cell of a first base station to a cell of a second base station, or from a cell of a first distributed unit (DU) of a base station to a cell of a second DU of the same base station, depending on the scenario. 3GPP specifications 36.300 v15.6.0 and 38.300 v15.6.0 describe a handover procedure that includes several steps (RRC signaling and preparation) between RAN nodes, which causes latency in the handover procedure and therefore increases the risk of handover failure. This procedure, which does not involve conditions that are checked at the UE, can be referred to as an "immediate" handover procedure.

More recently, for both SN addition/change and handover, "conditional" procedures have been considered (i.e., conditional SN addition/change and conditional handover). Unlike the "immediate" procedures discussed above, these procedures do not add or change the SN, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.). Moreover, the term "condition" may be used herein to refer to the condition in the abstract (e.g., signal quality being in a particular state), or to refer to a condition configuration (e.g., a digital representation/expression of the condition that can be transmitted and stored, etc.).

To configure a conditional procedure, the RAN provides the condition to the UE, along with a configuration (e.g., a set of random-access preambles, etc.) that will enable the UE to communicate with the appropriate base station, or via the appropriate cell, when the condition is satisfied. For a conditional addition of a base station as an SN, for example, the RAN provides the UE with a condition to be satisfied before the UE can add that base station as the SN, and a configuration that enables the UE to communicate with that base station after the condition has been satisfied.

Currently, after a UE configured for a conditional procedure suspends the radio connection with a base station, the RAN may not always manage these resources associated with the conditional procedure efficiently. As a result, the RAN may prematurely deplete the pool of resources that the RAN could allocate to other UEs, or delay allocation of resources to other UEs.

SUMMARY

Generally speaking, a base station and/or a UE of this disclosure efficiently manage conditional connection information, which can include configuration data related to a candidate base station and one or more conditions for the UE to connect to the candidate base station, when the UE suspends a radio connection with the base station. The conditional connection information can pertain to a procedure for conditional secondary node (SN) addition, according to which the base station begins to operate as a master node (MN), and the UE begins to operate in dual connectivity (DC) with the MN and the SN. In another scenario, the conditional connection information can pertain to a conditional handover procedure, according to which base station operates as a source base station and hands over the to a target base station. Both the source base station and the target base station in some implementations operate as MNs relative to the same or different SNs.

In some implementations, the base station determines that it should release the conditional connection information when the UE and the base station resume a previously suspended radio connection. To this end, the base station can send an appropriate indication to the candidate SN or the candidate target base station. Depending on the particular implementation, the base station releases the conditional connection information in response to requesting that the UE suspend the radio connection, receiving a message from the UE requesting that the suspended radio connection be resumed, upon requesting that the UE suspend the radio connection, in response to receiving a request to retrieve a context for the UE, etc. Further, the base station in various implementations or scenarios can instruct the UE to release or retain the conditional connection information using explicit (e.g., a field present in a message) or implicit (e.g., a field omitted from the message) indications.

In some implementations, the UE determines that it should retain rather than release the conditional connection information when resuming a previously suspended radio connection with a base station. The UE in some cases relies on implicit or explicit indications from the base station discussed above. The UE subsequently can use the conditional connection information to connect to a candidate SN or target MN, for example.

One embodiment of these techniques is a method in a first base station for managing a conditional operation related to a user equipment (UE). The method includes sending, by processing hardware to the UE, a conditional connection information including (i) configuration data related to a second base station in order for the UE to operate in dual connectivity with the first base station and the second base station, and (ii) one or more conditions for connecting to the second base station; and in response to determining, by the processing hardware, that the UE is to suspend a radio connection with the first base station: (i) causing the UE to suspend a radio connection with the first base station, and (ii) causing the second base station to release the conditional connection information.

Another example embodiment of these techniques is a base station including processing hardware and configured to implement the method above.

Another embodiment of these techniques is a method in a UE with a radio connection to a first base station for managing a conditional operation related to a second base station. The method includes receiving, by processing hardware from the first base station, a conditional connection information including (i) configuration data related to the second base station in order for the UE to operate in dual connectivity with the first base station and the second base station, and (ii) one or more conditions for connecting to the second base station; suspending, by the processing hardware, the radio connection in response to a triggering event; and releasing, by the processing hardware, the conditional connection information in response to the triggering event.

Still embodiment of these techniques is a method in a UE with a radio connection to a first base station for managing a conditional operation related to a second base station. The method includes receiving, by processing hardware from the first base station, a conditional connection information including at least one of a (i) configuration data related to the second base station and (ii) one or more conditions for connecting to the second base station; receiving, by the processing hardware from the base station, a suspension indication indicating that the UE is to suspend the radio connection; receiving, by the processing hardware, a conditional connection indication indicating whether the UE is to release the conditional connection information; and releasing or retaining the conditional connection information in accordance with the conditional connection indication.

Another embodiment of these techniques is UE including processing hardware and configured to implement any of the two methods above.

DETAILED DESCRIPTION OF THE DRAWINGS

Figure 1:
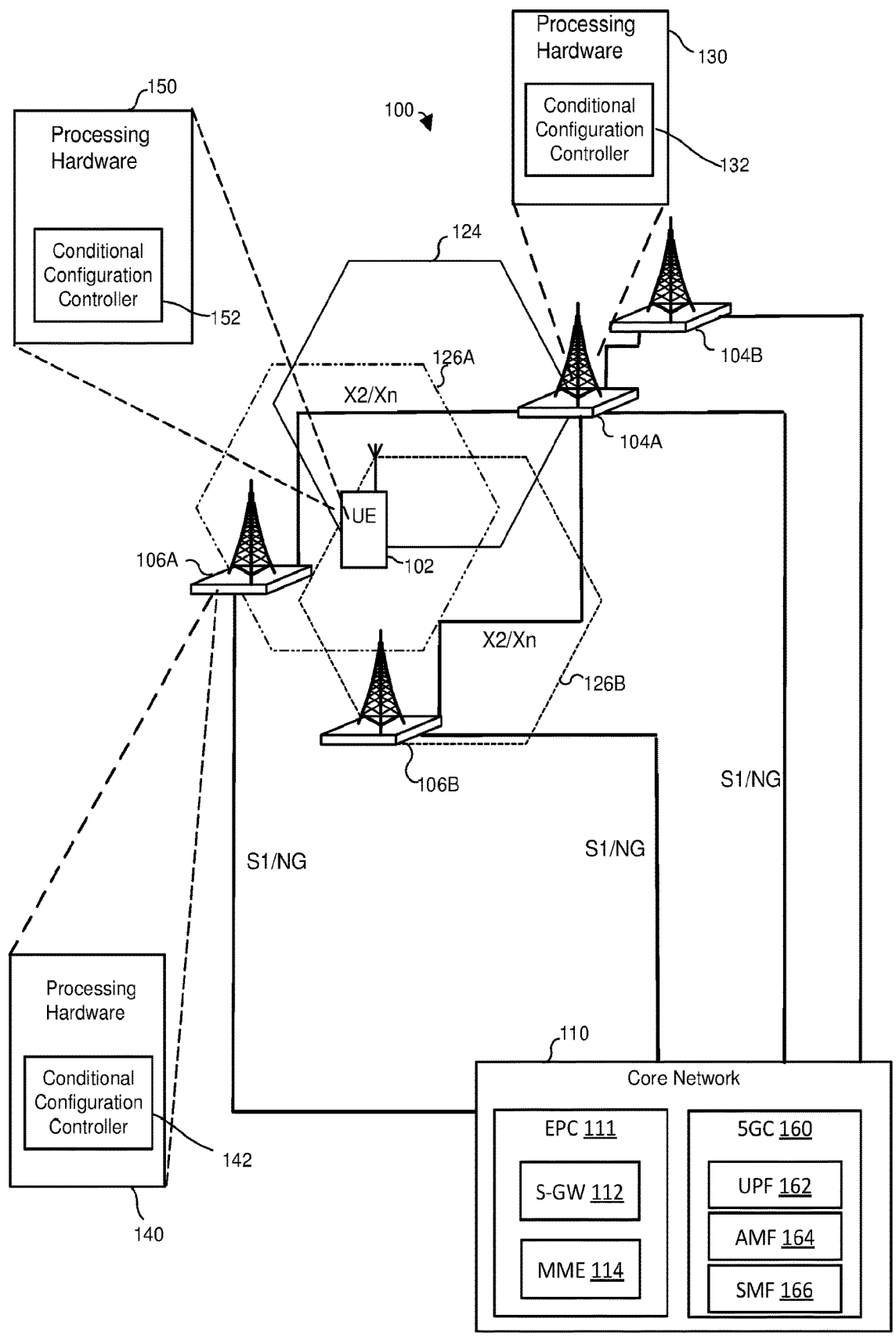
FIG. 1 illustrates an example communication system in which the techniques for managing conditional handover and/or secondary node (SN) operations can be implemented.

FIG. 1 depicts an example wireless communication system 100 that can implement conditional configuration management techniques of this disclosure when a UE has suspended a radio connection with a base station. As discussed in more detail below, the conditional configuration management techniques can relate to conditional additional of an SN or to conditional handover, for example.

The wireless communication system 100 includes a UE 102 as well as base stations 104A, 104B, 06A, 106B that are connected to a core network (CN) 110. The base stations 104A, 106A, 106B can be any suitable type, or types, of base stations, such as an evolved node B (eNB), a next-generation eNB (ng-eNB), or a 5G Node B (gNB), for example. As a more specific example, the base station 104A may be an eNB or a gNB, and the base station 106A and 106B may be gNBs.

The base station 104A supports a cell 124, the base station 106A supports a cell 126A, and the base station 106B supports a cell 126B. The base station 104B also supports one or more cells, which are not shown in FIG. 1 to avoid clutter. The cell 124 partially overlaps with both of cells 126A and 126B, so that the UE 102 can be in range to communicate with the base station 106A while simultaneously being in range to communicate with the base station 106A or 106B (or in range to detect or measure the signal from both base stations 104A and 106A, etc.). The overlap may make it possible for the UE 102 to hand over between cells (e.g., from cell 124 to cell 126A or 126B, or from cell 124 to the cell of the base station 104B) before the UE 102 experiences radio link failure, for example. Moreover, the overlap allows the various DC scenarios discussed below. For example, the UE 102 can communicate in DC with the base station 104A (operating as an MN) and the base station 106A (operating as an SN) and, upon completing an SN change, can communicate with the base station 104A (operating as an MN) and the base station 106B (operating as an SN). More particularly, when the UE 102 is in DC with the base station 104A and the base station 106A, the base station 104A operates as an MeNB, an Mng-eNB or an MgNB, and the base station 106A operates as an SgNB or an Sng-eNB.

In implementations and scenarios where the UE 102 is in SC with the base station 104A but is capable of operating in DC, the base station 104A operates as an MeNB, an Mng-eNB or an MgNB, and the base station 106A operates as a candidate SgNB (C-SgNB) or a candidate Sng-eNB (C-Sng-eNB).

In the scenarios where the UE 102 hands over from the base station 104A to the base station 104B, the base stations 104A and 104B operate as the source base station (S-BS) and a target base station (T-BS), respectively. The UE 102 can operate in DC with the base station 104A and a base station 106A for example prior to the handover, and continue to operate in DC with the base station 104A and the base station 106A after completing the handover. The base stations 104A and 104B in this case operate as a source MN (S-MN) and a target MN (T-MN), respectively, provided the handover is immediate. When the handover is conditional, the base station operates as a conditional T-MN (C-T-MN) or simply C-MN.

Although various scenarios are described below in which the base station 104A operates as an MN and the base station 106A (or 106B) operates as an SN or C-SN, any of the base stations 104A, 104B, 106A, 106B generally can operate as an MN, an SN or a C-SN in different scenarios. Thus, in some implementations, the base station 104A, the base station 104B, the base station 106A, and the base station 106B can implement similar sets of functions and each support MN, SN and C-SN operations.

In operation, the UE 102 can use a radio bearer (e.g., a DRB or an SRB) that at different times terminates at an MN (e.g., the base station 104A) or an SN (e.g., the base station 106A). The UE 102 can apply one or more security keys when communicating on the radio bearer, in the uplink (from the UE 102 to a base station) and/or downlink (from a base station to the UE 102) direction.

The base station 104A includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1 includes a conditional configuration controller 132 that is configured to manage or control the conditional configuration techniques of this disclosure. For example, the conditional configuration controller 132 may be configured to support RRC messaging associated with immediate and conditional handover procedures, and/or to support the necessary operations when the base station 104A operates as an MN relative to an SN. Moreover, in some implementations and/or scenarios, the conditional configuration controller 132 may be responsible for maintaining (for the UE 102 and a number of other UEs not shown in FIG. 1) current sets of conditional configurations in accordance with various implementations discussed below.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1 includes a conditional configuration controller 142 that is configured to manage or control RRC procedures and RRC configurations. For example, the conditional configuration controller 142 may be configured to support RRC messaging associated with immediate and conditional handover procedures, and/or to support the necessary operations when the base station 106A operates as an SN or candidate SN (C-SN). Moreover, in some implementations and/or scenarios, the conditional configuration controller 142 may be responsible for maintaining (for the UE 102 and a number of other UEs not shown in FIG. 1) current sets of conditional configurations in accordance with various implementations discussed below. While not shown in FIG. 1, the base station 106B may include processing hardware similar to the processing hardware 140 of the base station 106A.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1 includes a conditional configuration controller 152 that is configured to manage or control RRC procedures and RRC configurations related to conditional configurations. For example, the conditional configuration controller 152 may be configured to support RRC messaging associated with immediate and conditional handover and/or secondary node addition/modification procedures, and may also be responsible for maintaining a current set of conditional configurations for the UE 102 (e.g., adding, releasing or modifying conditional configurations as needed) in accordance with any of the implementations discussed below.

The CN 110 may be an evolved packet core (EPC) 111 or a fifth-generation core (5GC) 160, both of which are depicted in FIG. 1. The base stations 104A and 104B may be an eNB supporting an Si interface for communicating with the EPC 111, an ng-eNB supporting an NG interface for communicating with the 5GC 160, or as a base station that supports the NR radio interface as well as an NG interface for communicating with the 5GC 160. The base station 106A may be an EN-DC gNB (en-gNB) with an Si interface to the EPC 111, an en-gNB that does not connect to the EPC 111, a gNB that supports the NR radio interface as well as an NG interface to the 5GC 160, or an ng-eNB that supports an EUTRA radio interface as well as an NG interface to the 5GC 160. To directly exchange messages with each other during the various scenarios discussed below, the base stations 104A, 104B, 106A, 106B may support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is generally configured to manage authentication, registration, paging, and other related functions. The 5GC 160 includes a User Plane Function (UPF) 162 and an Access and Mobility Management Function (AMF) 164, and/or a Session Management Function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

Generally, the wireless communication system 100 may include any suitable number of base stations supporting NR cells and/or EUTRA cells. More particularly, the EPC 111 or the 5GC 160 can be connected to any suitable number of base stations supporting NR cells and/or EUTRA cells. For example, an additional base station is considered in immediate and conditional handover scenarios that are discussed below with reference to FIG. 1B. Although the examples below refer specifically to specific CN types (EPC, 5GC) and RAT types (5G NR and EUTRA), in general the techniques of this disclosure can also apply to other suitable radio access and/or core network technologies, such as sixth generation (6G) radio access and/or 6G core network or 5G NR-6G DC, for example.

As indicated above, the wireless communication system 100 may support various procedures (e.g., handover, SN addition, etc.) and modes of operation (e.g., SC or DC). Example operation of various procedures that may be implemented in the wireless communication system 100 will now be described.

In some implementations, the wireless communication system 100 supports immediate handovers between cells. In one scenario, for example, the UE 102 initially connects to the base station 104A, and the base station 104A later performs preparation for an immediate handover with the base station 106A via an interface (e.g., X2 or Xn). In this scenario, the base stations 104A and 106A operate as a source base station and a target base station, respectively. In the handover preparation, the source base station 104A sends a Handover Request message to the target base station 106A. In response, the target base station 106A includes an immediate handover command message in a Handover Request Acknowledge message, and sends the Handover Request Acknowledge message to the source base station 104A. The source base station 104A then transmits the handover command message to the UE 102 in response to receiving the Handover Request Acknowledge message.

Upon receiving the immediate handover command message, the UE 102 immediately reacts to the immediate handover command, by attempting to connect to the target base station 106A. To connect to the target base station 106A, the UE 102 may perform a random access procedure with the target base station 106A, and then (after gaining access to a control channel) transmit a handover complete message to the target base station 106A via a cell of the base station 106A (i.e., in response to the immediate handover command).

In some implementations, the wireless communication system 100 also supports conditional handovers. In one scenario, for example, the UE 102 initially connects to the base station 104A, and the base station 104A later performs a first conditional handover preparation procedure with the base station 106A via an interface (e.g., X2 or Xn) to prepare for a potential handover of the UE 102 to the base station 106A. In this scenario, the base stations 104A and 106A operate a source base station and a candidate base station, respectively. In the first conditional handover preparation procedure, the source base station 104A sends a Handover Request message to the candidate base station 106A. In response, the candidate base station 106A includes a first conditional handover command message in a Handover Request Acknowledge message, and sends the Handover Request Acknowledge message to the source base station 104A. The source base station 104A then transmits the first conditional handover command message to the UE 102, in response to receiving the Handover Request Acknowledge message.

Upon receiving the first conditional handover command message, the UE 102 does not immediately react to the first conditional handover command message by attempting to connect to the candidate base station 106A. Instead, the UE 102 connects to the candidate base station 106A according to the first conditional handover command message only if the UE 102 determines that a first condition is satisfied for handing over to a candidate cell 126A of the candidate base station 106A. The base station 106A provides a configuration for the candidate cell 126A (i.e., a configuration that the UE 102 can use to connect with the base station 106A via the candidate cell 126A) in the first conditional handover command message.

Before the first condition is met, the UE 102 has not yet connected to the candidate base station 106A. In other words, the candidate base station 106A has not yet connected and served the UE 102. In some implementations, the first condition can be that a signal strength/quality, as measured by the UE 102 on the candidate cell 126A of the candidate base station 106A, is "good" enough. For example, the first condition may be satisfied if one or more measurement results obtained by the UE 102 (when performing measurements on the candidate cell 126A) are above a threshold that is configured by the source base station 104A, or above a pre-determined or pre-configured threshold. If the UE 102 determines that the first condition is satisfied, the candidate base station 106A becomes the target base station 106A for the UE 102, and the UE 102 attempts to connect to the target base station 106A. To connect to the target base station 106A, the UE 102 may perform a random access procedure with the target base station 106A, and then (after gaining access to a control channel) transmit a first handover complete message via the candidate cell 126A to the target base station 106A. After the UE 102 successfully completes the random access procedure and/or transmits the first handover complete message, the target base station 106A becomes the source base station 106A for the UE 102, and the UE 102 starts communicating data with the source base station 106A.

In some implementations and/or scenarios, conditional handovers can occur with more than one candidate cell supported by the candidate base station 106A (e.g., cell 126A and another cell of base station 106A not shown in FIG. 1). In one such scenario, the base station 106A may provide a configuration of an additional candidate cell of the base station 106A, in addition to a configuration of the candidate cell 126A, in the first conditional handover command message. The UE 102 may then monitor whether a second condition is met for the additional candidate cell of the candidate base station 106A, while also monitoring whether the first condition is met for the candidate cell 126A. The second condition can be the same as or different from the first condition.

In another scenario, the base station 104A also performs a second conditional handover preparation procedure with the base station 106A via the interface (e.g., X2 or Xn), to prepare a potential handover of the UE 102 to the base station 106A, in a procedure similar to that described above. In this scenario, however, the base station 104A also transmits to the UE 102 a second conditional handover command message that the base station 104A received from the candidate base station 106A, for the potential handover in the second conditional handover preparation. The base station 106A may provide a configuration of an additional candidate cell (not shown in FIG. 1) in the second handover command message. The UE 102 may monitor whether a second condition is met for the additional candidate cell of the candidate base station 106A. The second condition can be the same as or different from the first condition.

The base station 104A may also perform a third conditional handover preparation procedure with the base station 106B via an interface (e.g., X2 or Xn), to prepare a potential handover of the UE 102 to the base station 106B, in a procedure similar to that described above. In this scenario, the base station 104A transmits to the UE 102 a third conditional handover command message, which the base station 104A received from the candidate base station 106B for the potential handover in the third conditional handover preparation. The base station 106A may provide a configuration of a candidate cell 126B in the third handover command message. The UE 102 may monitor whether a third condition is met for the candidate cell 126B of the candidate base station 106B. The third condition can be the same as or different from the first and/or second conditions. The conditional handover command messages above can be RRC reconfiguration messages, or may be replaced by conditional handover configurations that are information elements (IEs).

In some implementations, the wireless communication system 100 supports DC operation, including SN addition and SN change procedures. In one scenario, for example, after the UE 102 connects to the base station 104A, the base station 104A can perform an immediate SN addition procedure to add the base station 106A as a secondary node, thereby configuring the UE 102 to operate in DC with the base stations 104A and 106A. At this point, the base stations 104A and 106A operate as an MN and an SN, respectively. Later, while the UE 102 is still in DC with the MN 104A and the SN 106A, the MN 104A may perform an immediate SN change procedure to change the SN of the UE 102 from the base station 106A (which may be referred to as the source SN or S-SN) to the base station 106B (which may be referred to as the target SN or T-SN).

In other scenarios, the base station 104A may perform a conditional SN addition procedure to configure the base station 106A as a candidate SN (C-SN) for the UE 102, while the UE 102 is in single connectivity (SC) with the base station 104A, or while the UE 102 is in DC with the base stations 104A and 106B, and before the UE 102 has connected to the C-SN 106A. In this case, the base stations 104A and 106A operate as an MN and a C-SN, respectively, for the UE 102. When the UE 102 receives the configuration for the C-SN 106A, the UE 102 does not connect to the C-SN 106A unless and until the UE 102 detects that the corresponding condition is satisfied or the base station 104A performs an immediate SN addition procedure to add the base station 106A as a secondary node. If the UE 102 determines that the condition is satisfied, the UE 102 connects to the C-SN 106A, such that the C-SN 106A becomes the SN 106A for the UE 102.

In some implementations, the condition can be that a signal strength/quality, as measured by the UE 102 on a candidate primary secondary cell (C-PSCell) of the C-SN 106A, is "good" enough. For example, the first condition may be satisfied if one or more measurement results obtained by the UE 102 (when performing measurements on the C-PSCell) are above a threshold that is configured by the MN 104A, or above a pre-determined or pre-configured threshold. If the UE 102 determines that first condition is satisfied, the UE 102 may perform a random access procedure with the C-SN 106A to connect to the C-SN 106A. Once the UE 102 successfully completes the random access procedure, the base station 106A becomes an SN for the UE 102, and the C-PSCell (e.g., cell 126A) becomes a PSCell for the UE 102. The SN 106A may then start communicating data with the UE 102.

Yet another scenario relates to a conditional PSCell change. In this scenario, the UE 102 is initially in DC with the MN 104 (via a primary cell (PCell)) and the SN 106A (via a PSCell, not shown in FIG. 1, that is different than cell 126A). The SN 106A can provide a configuration for the C-PSCell 126A, for the UE 102. If the UE 102 is configured to a signaling radio bearer (SRB) that permits the exchange of RRC messages with the SN 106A (e.g., SRB3), the SN 106A may transmit the configuration for the C-PSCell 126A to the UE 102 directly via the SRB, or via the MN 104. The SN 106A may transmit the configuration in response to one or more measurement results received from the UE 102 via the SRB, or in response to one or more measurement results obtained by the SN 106A from measurements on signals received from the UE 102, for example.

In contrast to the immediate PSCell change case discussed above, the UE 102 does not immediately disconnect from the PSCell and attempt to connect to the C-PSCell 126A after receiving the configuration for the C-PSCell 126A. Instead, the UE 102 does not connect to the C-PSCell 126A until the UE 102 determines that a certain condition is satisfied. When the UE 102 determines that the condition has been satisfied, the UE 102 connects to the C-PSCell 126A, such that the C-PSCell 126A begins to operate as the PSCell 126A for the UE 102. In some implementations, the UE 102 disconnects from the PSCell in order to connect to the C-PSCell 126A.

In some scenarios, the condition associated with conditional SN addition or conditional PSCell change can be that signal strength/quality, as measured by the UE 102 on a C-PSCell of the C-SN 106A, exceeds a certain threshold or otherwise corresponds to an acceptable measurement. For example, when the one or more measurement results that the UE 102 obtains on the C-PSCell 126A are above a threshold configured by the MN 104 or the C-SN 106A, or above a pre-determined or pre-configured threshold, the UE 102 may determine that the condition is satisfied. When the UE 102 determines that such a condition is satisfied, the UE 102 can perform a random access procedure on the C-PSCell 126A and with the C-SN 106A to connect to the C-SN 106A. Once the UE 102 successfully completes the random access procedure on the C-PSCell 126A, the C-PSCell 126A becomes a PSCell 126A for the UE 102. The C-SN 106A can then start communicating data (user-plane data and/or control-plane data) with the UE 102 through the PSCell 126A.

In different configurations or scenarios of the wireless communication system 100, the base station 104A may operate as a master eNB (MeNB) or a master gNB (MgNB), and the base station 106A or 106B can be implemented as a secondary gNB (SgNB) or a candidate SgNB (C-SgNB). The UE 102 may communicate with the base station 104A and the base station 106A or 106B via the same radio access technology (RAT), such as EUTRA or NR, or via different RATs. If the base station 104A is an MeNB and the base station 106A is an SgNB, the UE 102 may be in EUTRA-NR DC (EN-DC) with the MeNB and the SgNB. In this scenario, the MeNB 104A may or may not configure the base station 106B as a C-SgNB to the UE 102. When the base station 104A is an MeNB and the base station 106A is a C-SgNB for the UE 102, the UE 102 may be in SC with the MeNB. In this scenario, the MeNB 104 may or may not configure the base station 106B as another C-SgNB to the UE 102.

In some cases, an MeNB, an SeNB or a C-SgNB may be implemented as an ng-eNB rather than an eNB. When the base station 104A is a master ng-eNB (Mng-eNB) and the base station 106A is a SgNB, the UE 102 may be in next generation (NG) EUTRA-NR DC (NGEN-DC) with the Mng-eNB and the SgNB. In this scenario, the MeNB 104A may or may not configure the base station 106B as a C-SgNB to the UE 102. When the base station 104A is an Mng-NB and the base station 106A is a C-SgNB for the UE 102, the UE 102 may be in SC with the Mng-NB. In this scenario, the Mng-eNB 104A may or may not configure the base station 106B as another C-SgNB to the UE 102.

When the base station 104A is an MgNB and the base station 106A is an SgNB, the UE 102 may be in NR-NR DC (NR-DC) with the MgNB and the SgNB. In this scenario, the MeNB 104A may or may not configure the base station 106B as a C-SgNB to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A is a secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

Figure 2:
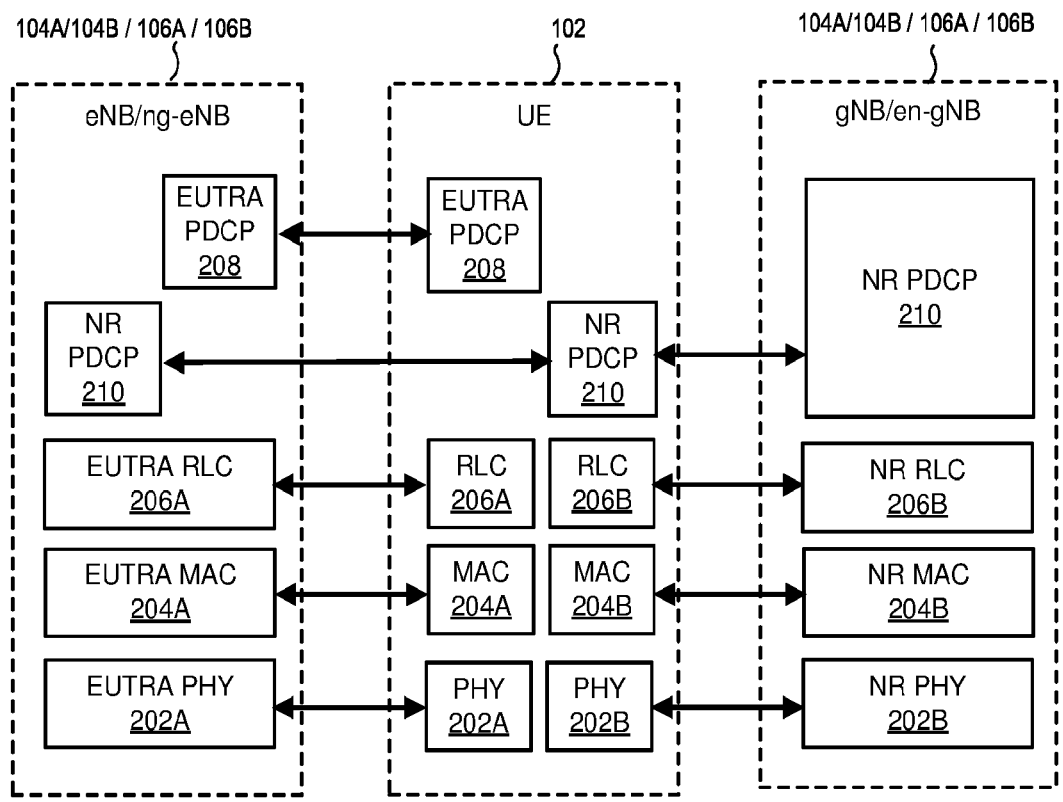
FIG. 2 is a block diagram of an example protocol stack according to which the UE of FIG. 1 communicates with base stations.

Next, FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the BS 104A operating as a MeNB and the BS 106A operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

Next, several known techniques related to conditional configuration are briefly discussed with reference to FIGS. 3-6.

Figure 3:
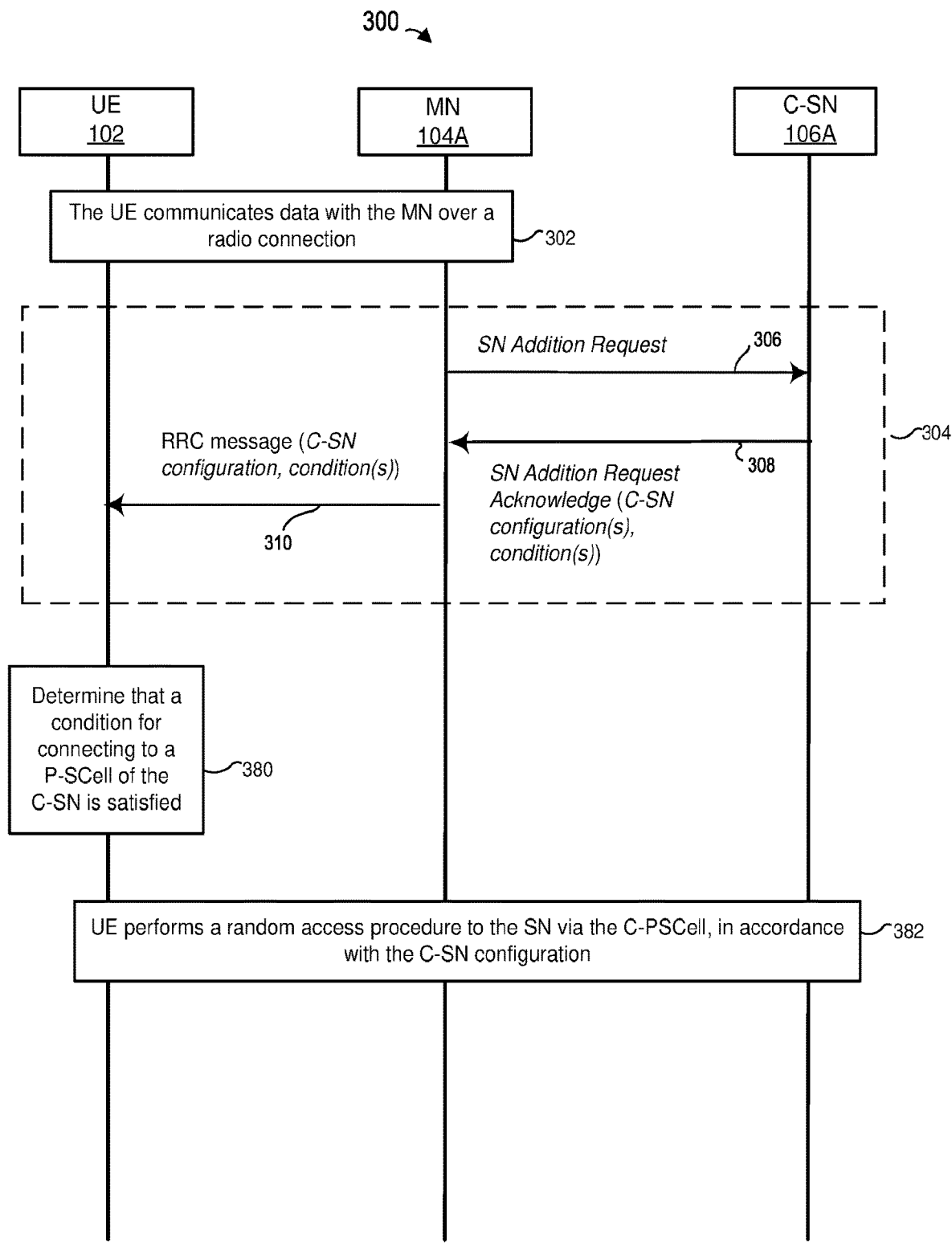
FIG. 3 is a messaging diagram of a scenario in which an MN conditionally adds a candidate SN (C-SN) for dual connectivity (DC) of the UE, according to a known technique.

Referring first to FIG. 3, the base station 104A in a scenario 300 operates as an MN, and the base station 106A operates as a C-SN. Initially, the UE 102 communicates 302 with the MN 104A. In one scenario, the UE 102 in SC with the MN 104A communicates data (e.g., UL Data PDUs and/or DL Data PDUs) with MN 104A. In another scenario, the UE 102 in DC with the MN 104A and the SN 106B communicates data (e.g., UL Data PDUs and/or DL Data PDUs) with the MN 104A and/or the SN 106B (not shown in FIG. 3). In a further scenario, the UE 102 in DC with the MN 104A and the SN 106A communicates data (e.g., UL Data PDUs and/or DL Data PDUs) with the MN 104A and/or the SN 106B. The MN 104A can determine that it should initiate a conditional SN Addition procedure 304 to configure the base station 106A as a C-SN for the UE 102 or configure a cell of the base station 106A, which can be a C-SN or a SN, as a C-PSCell for the UE 102. The MN 104A can make this determination based on one or more measurement results received from the UE 102, for example, or another suitable event. In response to this determination, the MN 104A sends 306 a SN Addition Request message to the C-SN 106A to initiate a conditional SN Addition procedure. In response to receiving 306 the SN Addition Request message, the C-SN 106A includes a C-SN configuration in an SN Addition Request Acknowledge message for the UE 102. The SN 106A then sends 308 the SN Addition Request Acknowledge message to the MN 104A, in response to the SN Addition Request message. The C-SN configuration included in this message can include one or more configuration parameters for a C-PSCell.

For convenience, the discussion below refers to the configuration in singular, but it will be understood that the C-SN 106A can provide multiple C-SN configurations where each includes one or more configuration parameters for a particular C-PSCell.

In some implementations, the MN 104A can include in the SN Addition Request message a request that the base station 106A operates as a C-SN for the UE 102. In other implementations, a specific request message instead of the SN Addition Request message can be defined and sent by the MN 104A to the base station 106A to request the base station 106A to operate as a C-SN for the UE 102. The C-SN 106 may send a specific request acknowledge message including the C-SN configuration instead of the SN Addition Request Acknowledge message.

In some implementations, the MN 104A can include the C-SN configuration and, in some cases, one or more conditions for connecting to the C-SN 106A via the C-PSCell, in a first RRC message. The information in the first RRC message can include one or more indicators or parameters such as a field name, a dedicated information element (IE), and/or an indication of the condition(s) associated with the C-SN configuration.

In some implementations, the C-SN configuration can include a group configuration (CellGroupConfig) IEs that configure the C-PSCell. In one implementation, the SN 106A may include a RRCReconfiguration message including the CellGroupConfig IE in the SN Addition Request Acknowledge message. The CellGroupConfig IE can conform to 3GPP TS 38.331.

In other implementations, the C-SN configuration can be a SCG-ConfigPartSCG-r12 IE configuring the C-PSCell. In one implementation, the SN 106A may include a RRCConnectionReconfiguration message including the ConfigPartSCG-r12 IE in the SN Addition Request Acknowledge message. In other implementations, the C-SN configuration can be a RRCConnectionReconfiguration message including the SCG-ConfigPartSCG-r12 IE. The SCG-ConfigPartSCG-r12 IE can conform to 3GPP TS 36.331.

With continued reference to FIG. 3, in response to receiving 308 the SN Addition Request Acknowledge message, the MN 104A includes the C-SN configuration and at least one condition in the first RRC message and transmits 310 the first RRC message to the UE 102. In some implementations, the UE 102 transmits a first RRC response message to the MN 104 in response to the first RRC message. In one example, the first RRC message can be an RRC Connection Reconfiguration (e.g., RRCConnectionReconfiguration) message and the first RRC response message can be an RRC Connection Reconfiguration Complete (e.g., RRCConnectionReconfigurationComplete) message. In another example, the first RRC message can be an RRC Reconfiguration (e.g., RRCReconfiguration) message and the first RRC response message can be an RRC Reconfiguration Complete (e.g., RRCReconfigurationComplete) message.

The events 306, 308, 310 collectively can be considered to define a conditional configuration procedure 304.

The UE 102 applies the received at least one condition (discussed below in singular for convenience) to determine whether to connect to the C-SN 106A via the C-PSCell. If the UE 102 determines that the condition is satisfied, the UE 102 connects to the C-SN 106A via the C-PSCell according to the C-SN configuration. If the UE 102 does not determine that the condition is satisfied, the UE 102 does not connect to the C-SN 106A via the C-PSCell according to the C-SN configuration.

Depending on the implementation, the UE 102 can connect to the C-SN 106 via the C-PSCell if one but necessarily all of the multiple conditions is satisfied, or the UE 102 can connect to the C-SN 106 only if every condition is satisfied.

When the UE 102 determines 380 that the condition for connecting to the C-PSCell is satisfied, the UE 102 initiates 382 a random access procedure via the C-PSCell with the C-SN 106A in response to the detection. The UE 102 performs 382 the random access procedure with the C-SN 106A via the C-PSCell. If the UE successfully completes the random access procedure, the C-SN 106A begins to operate as an SN to transmit data to the UE 102 and/or receive data from the UE 102.

If the base station 106A is a SN for the UE 102, a SN Modification Request message can be used by the MN 104 instead of the SN Addition Request message, and a SN Modification Request Acknowledge message can be used by the SN 106A instead of the SN Addition Request Acknowledge message.

Figure 4:
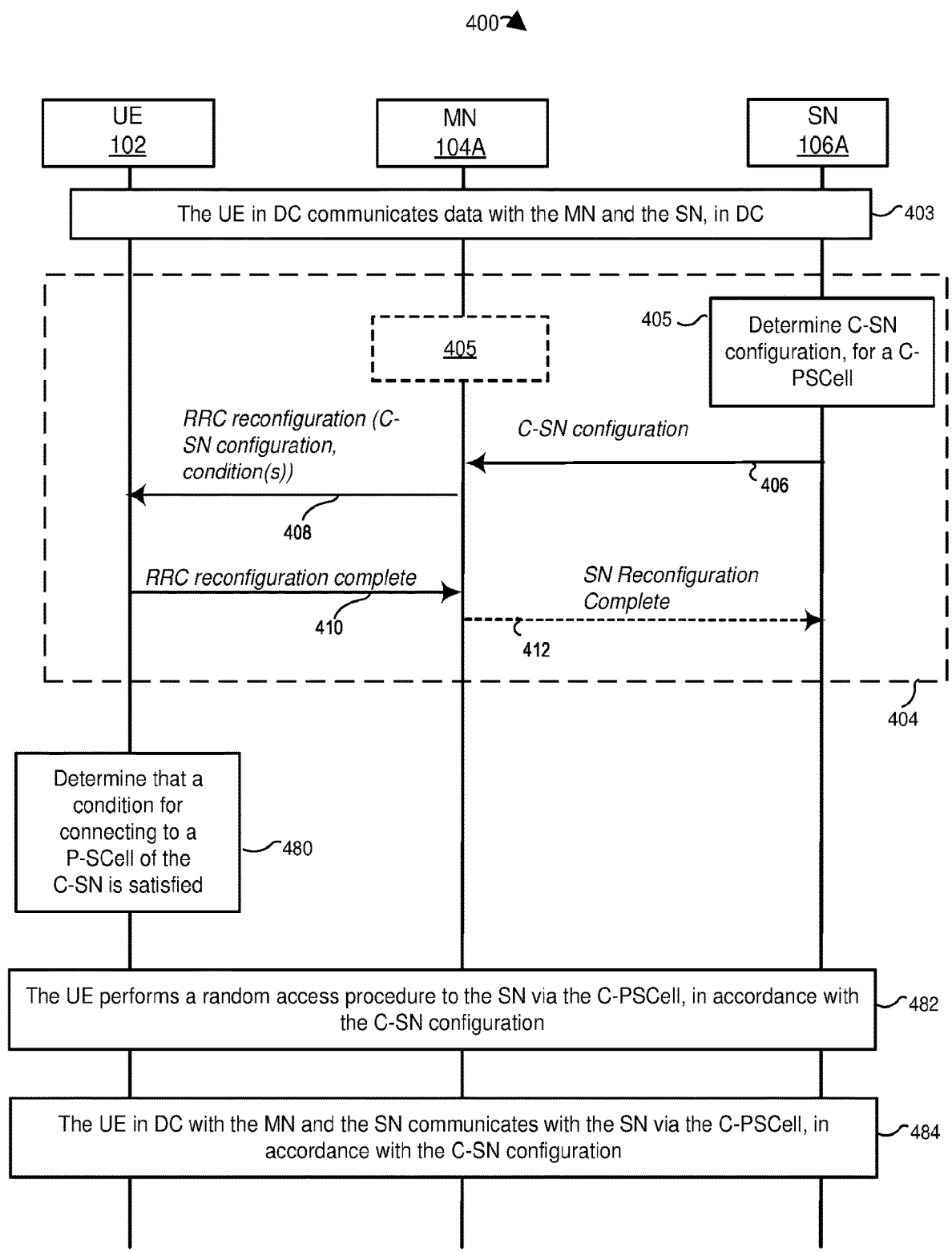
FIG. 4 is a messaging diagram of a scenario in which an SN conditionally configures a cell to which a UE, operating in DC with an MN and the SN, is to connect subject to one or more conditions, according to a known technique.

In the scenario 400 of FIG. 4, the base station 104A operates as an MN, and the base station 106A operates as a SN. Initially, the UE 102 communicates 403 in DC with the MN 104A and the SN 106A. The SN 106A then determines 405 conditional connection information for a C-PSCell. The conditional connection information can include configuration data related the SN 106A (more particularly, the C-PSCell of the SN 106A) and one or more conditions for connecting to the SN 106A. The SN 106A thus determines that the UE 102 can operate in DC with the MN 104 and a cell of the SN 106A different than the cell to which the UE 102 currently is connected (event 403), subject one or more conditions. In another implementation, the event 405 occurs at the MN 104A.

The SN 106A in this scenario provides 406 conditional connection information to the MN 104A, which in turns provides 408 the conditional connection information to the UE 102 via an RRC Reconfiguration message. The UE 120 can respond 410 with an RRC Reconfiguration Complete message, and the MN 104A optionally sends 412 an SN Reconfiguration Complete message to the SN 106. Collectively, the events 405, 406, 408, 410, and 412 define a conditional SN reconfiguration procedure 404.

When the UE 102 determines 480 that the condition for connecting to the C-PSCell is satisfied, the UE 102 initiates 482 a random access procedure via the C-PSCell with the C-SN 106A in response to the detection. The UE 102 performs 382 the random access procedure with the C-SN 106A via the C-PSCell. If the UE successfully completes the random access procedure, the C-SN 106A operates 484 as an SN to transmit data to the UE 102 and/or receive data from the UE 102.

Figure 5:
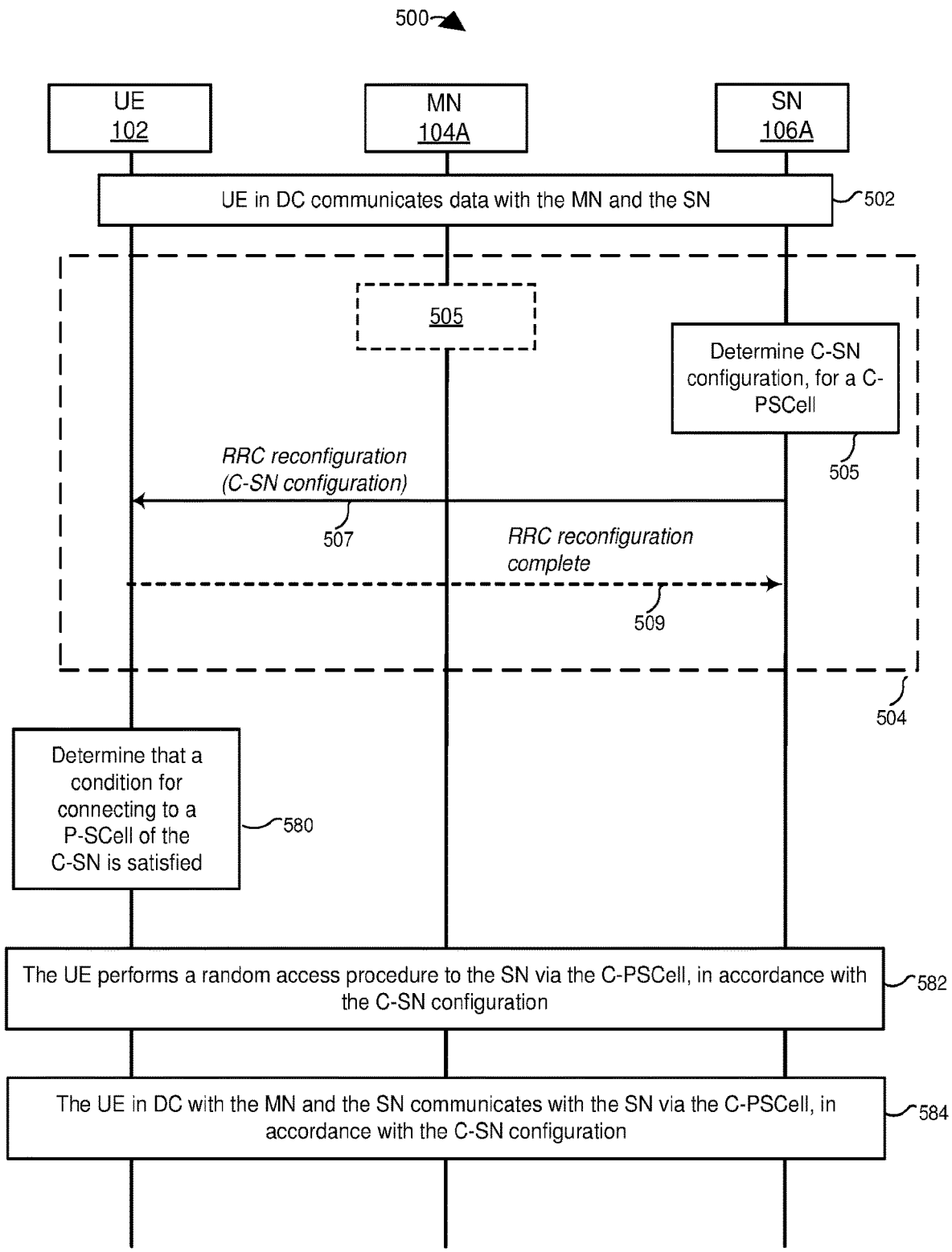
FIG. 5 is a messaging diagram of another scenario in which an SN conditionally configures a cell for a UE, by communicating with the UE directly rather than via the MN, according to a known technique.

FIG. 5 illustrates a scenario 500 generally similar to the scenario 400 of FIG. 4, but here the SN 106A directly sends 507 the conditional connection information to the UE 102 in an RRC Reconfiguration message, via the already existing radio connection between the UE 102 and the SN 106. The UE 102 optionally can respond 509 with an RRC Reconfiguration Complete message. The events 505, 507, and 509 thus define another conditional SN reconfiguration procedure 504. The events 580, 582, and 584 are similar to the events 480, 482, and 484 discussed above.

Figure 6:
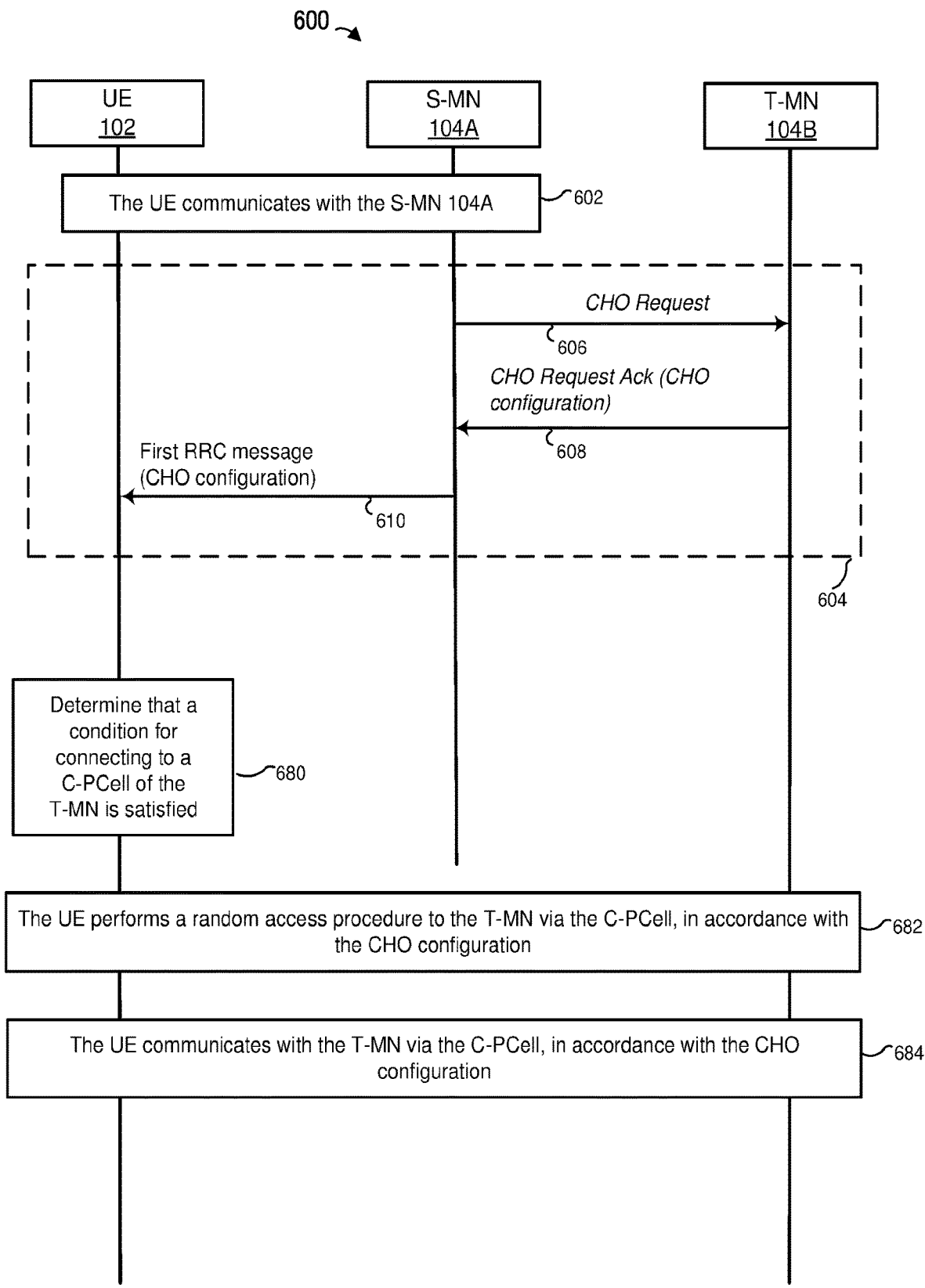
FIG. 6 is a messaging diagram of a scenario in which a source base station configures a conditional handover of a UE to another base station, subject to one or more conditions, according to a known technique.

Next, FIG. 6 illustrates a scenario 600 in which the UE 102 initially communicates 602 with the MN 104A. The MN 104A can determine that it should initiate a conditional handover procedure 604 to hand the UE 102 over to the target MN 104B and, more particularly, the C-PCell of the MN 104B. The MN 104A can make this determination based on one or more measurement results received from the UE 102, for example, or another suitable event. In response to this determination, the MN 104A sends 606 a Conditional Handover Request message to the T-M 104B.

In response to receiving 606 the Conditional Handover Request message, the T-MN 104B generates conditional connection information, which in this case includes a conditional handover configuration. The T-MN 104B sends 608 a Conditional Handover Request Acknowledge message to the S-MN 104A, and the S-MN 104A sends 610 the conditional connection information to the UE 102 in an RRC message. Similar to the examples above, the conditional connection information can include configuration data as well as one or more conditions for handing over to the T-MN 104B. The events 606, 608, and 610 thus define the conditional handover procedure 604.

When the UE 102 determines 680 that the condition for handing over to the T-MN 104B is satisfied, the UE 102 initiates 682 a random access procedure via the C-PCell of the T-MN 104B in response to the detection. Upon successfully completing this procedure, the UE 102 communicates 684 with the T-MN 104B via the C-PCell, in accordance with the conditional handover configuration.

Several techniques of this disclosure for managing conditional configuration are discussed next with reference to FIGS. 7-15.

Figure 7:
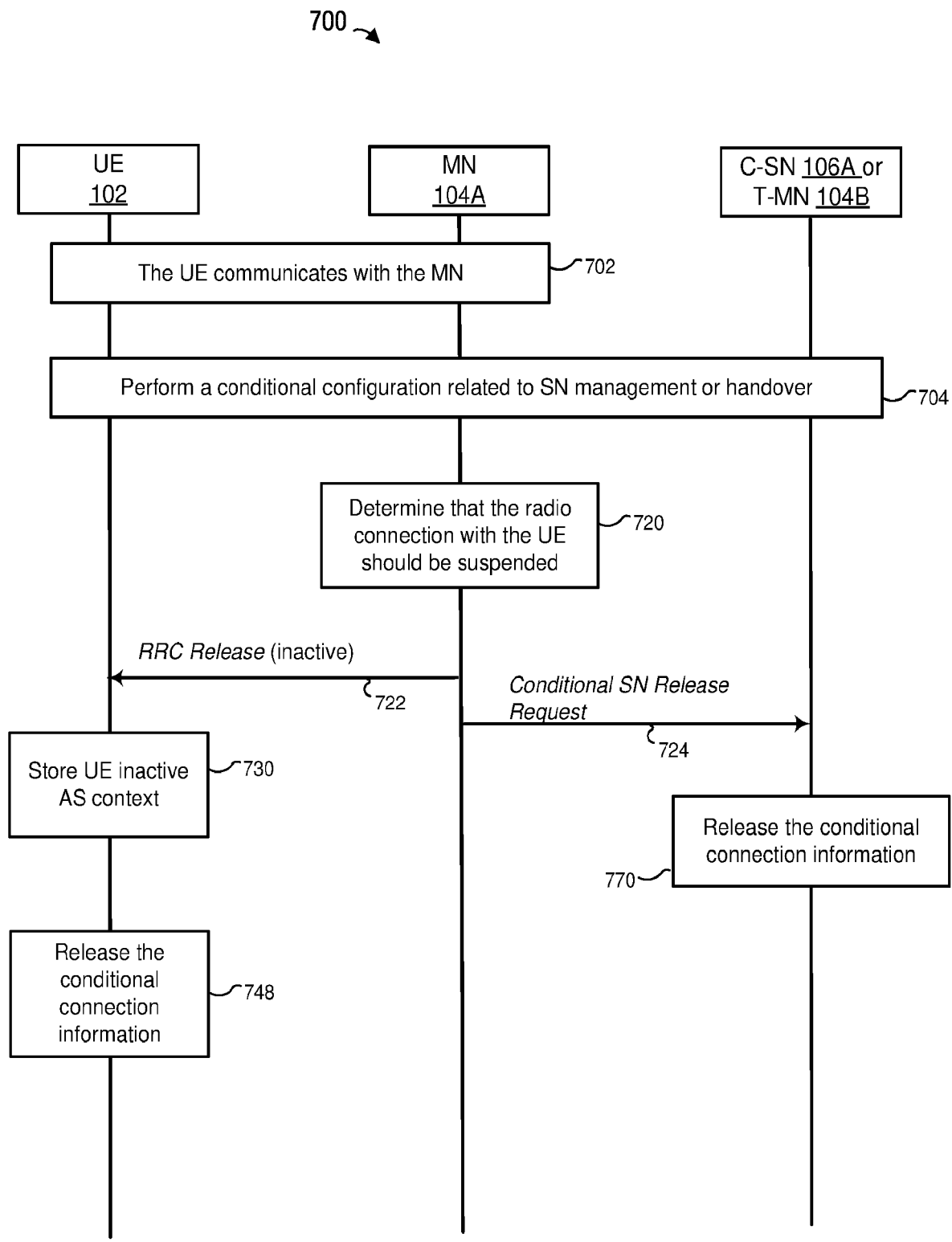
FIG. 7 is a messaging diagram of a scenario in which a base station, operating as an MN in conditional SN management scenarios or a source MN (S-MN) in conditional scenarios, determines that the UE should suspend the radio connection with the base station and notifies another base station, operating respectively as an SN or a target MN, that conditional connection information should be released.

FIG. 7 illustrates a scenario 700 in which the base station 104A operates as an MN and the base station 106A operates as a C-SN or a SN ((C-)SN), or the base station 104B operates as a T-MN. When the scenario 700 involves the base station 104B, the UE 102 can operate in SC with the base station 104B or DC with the base station 104B or another base station. For convenience, this disclosure refers to the base station 104B as the "MN" in both cases.

Initially, the UE 102 communicates 702 with the MN (e.g., in an RRC CONNECTED state). The MN 104 performs 704 a conditional configuration procedure, which can be a C-SN configuration procedure with (C-)SN 106A similar to procedures 304, 404 or 504, or a conditional handover procedure with the T-MN 104B similar to procedure 604.

The MN 104A then determines 720 that the UE 102 should suspend the radio connection (e.g., the RRC connection) with the MN 104A. To this end, the MN 104A can determine 720 that the UE 102 should transition to an inactive state, or transition to an idle state with a suspended RRC connection. In response to this determination, the MN 104A transmits 722 an RRC release message (e.g., RRCRelease or RRCConnectionRelease) including an inactive field (e.g., a suspendConfig, rrc-Suspend or rrc-InactiveConfig) to the UE 102.

The MN 104 in this implementation also transmits a 724 a Conditional SN Release Request and/or SN Release Request ((Conditional) SN Release Request) message to the (C-) SN 106A. In various implementations, the MN 104 transmits 724 the (Conditional) SN Release Request before or after transmitting 722 the RRC Release message. In response to receiving the 724 (Conditional) SN Release Request from the MN 104, the (C-)SN 106A may transmit an (Conditional) SN Release Request Acknowledge to the MN 104 (not shown). In response to the (Conditional) SN Release Request Acknowledge, the MN 104 may transmit a UE Context Release to the (C-)SN 106A (not shown); and in response to receiving the SN Release Request or the UE Context Release, the (C-)SN 106A releases 770 the C-SN or conditional handover configuration.

When the UE 102 is in DC with the MN 104A and the SN 106B, the MN 104A in some implementations transmits an SN Release Request to the SN 106B. In response to receiving the SN Release Request from the MN 104A, the SN 106B may transmit an SN Release Request Acknowledge to the MN 104A. In response to the SN Release Request Acknowledge, the MN 104 may transmit a UE Context Release to the SN 106B. In response to receiving the SN Release Request or the UE Context Release, the SN 106B releases the SCG configuration. In response to the RRC release message, the UE 102 stores 730 the UE Inactive AS context and releases 748 the C-SN configuration.

When the UE 102 is in DC with the MN 104A and the SN 106B, or in SC with the MN 104A, the MN 104A in some implementations transmits a CHO Release Request message to the T-MN 104B. In response to the CHO Release Request message, the T-MN 104B releases 770 the conditional handover configuration. Further, in response to the RRC release message, the UE 102 stores 730 the UE Inactive AS context and releases 748 the conditional handover configuration.

Figure 8:
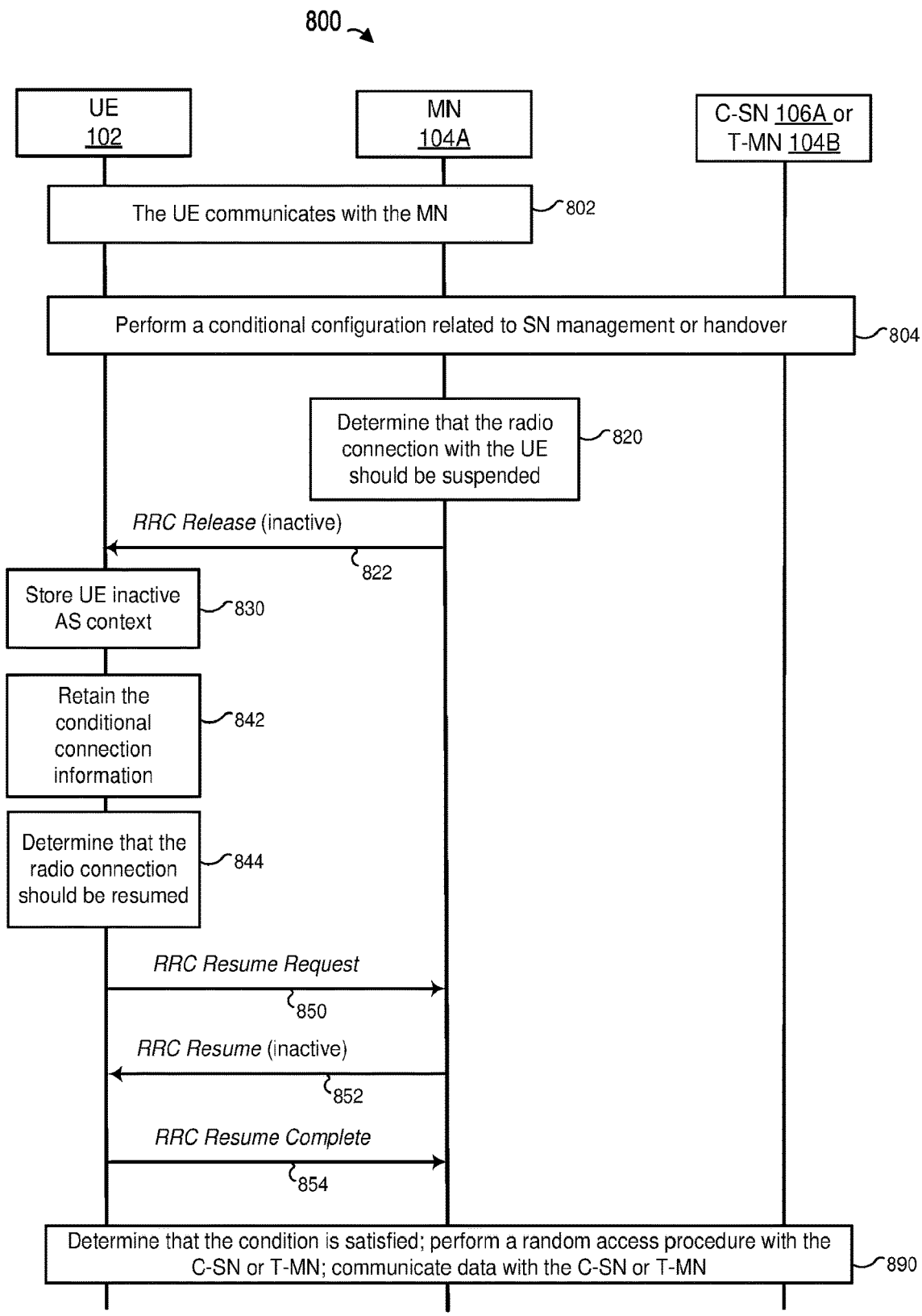
FIG. 8 is a messaging diagram of a scenario in which a UE receives conditional connection information pertaining to SN management or handover, suspends the radio connection with an MN or S-MN, and retains the conditional connection information when resuming the radio connection.

FIG. 8 illustrates a scenario 800 in which the base station 104A operates as an MN and base station 106A operates as a C-SN or a SN ((C-)SN), or the base station 104B operates as a T-MN. The events 802, 804, and 822 are similar to events 702, 704, and 722 discussed above.

However, in response to receiving 822 the RRC Release message, the UE 102 stores 830 the UE Inactive AS context and retains 842 the C-SN or conditional handover configuration. In some implementations, the UE 102 stops or suspends detecting the condition associated to the C-SN or conditional handover configuration.

After a certain period of time, the UE 102 can determine 844 to perform an RRC resume procedure. In response to the determination, the UE 102 transmits 850 an RRC resume request message to the MN 104A and receives 852 an RRC resume message in response. In response to the RRC resume message, the UE 102 enters the connected state and transmits 854 an RRC resume complete message to the MN 104A. The UE 102 in the connected state continues or resumes detecting the condition(s) associated with the C-SN or conditional configuration or conditional handover configuration, and performs 890 procedures similar to the procedures 382, (482, 484), (582, 584), or (682, 684).

In some implementations, the MN 104A may include a SK-counter value in the RRC resume message. The UE 102 derives or updates a secondary key (S-$K_{gNB}$ or S-$K_{eNB}$) based on a $K_{eNB}$ key and using the received sk-Counter value, derives ciphering keys (e.g., $K_{RRCenc}$ and $K_{UPenc}$ keys) and derives integrity keys (e.g., $K_{RRCint}$ and $K_{UPint}$ keys), as specified in 3GPP TS or TS 33.501. The UE 102 may not derive the $K_{UPint}$ key if the UE 102 is not configured with integrity protection for a data radio bearer (DRB). The UE uses the ciphering keys and integrity keys to communicate data with the (C-)SN 106A of T-MN 104B via the C-PSCell at events 482, 484), (582, 584), or (682, 684).

If the MN 104A is an eNB or ng-eNB, the RRC resume procedure is an RRC connection resume procedure specified in 3GPP TS 36.331. If the MN 104A is a gNB, the RRC resume procedure is an RRC connection resume procedure specified in 3GPP TS 38.331.

Figure 9:
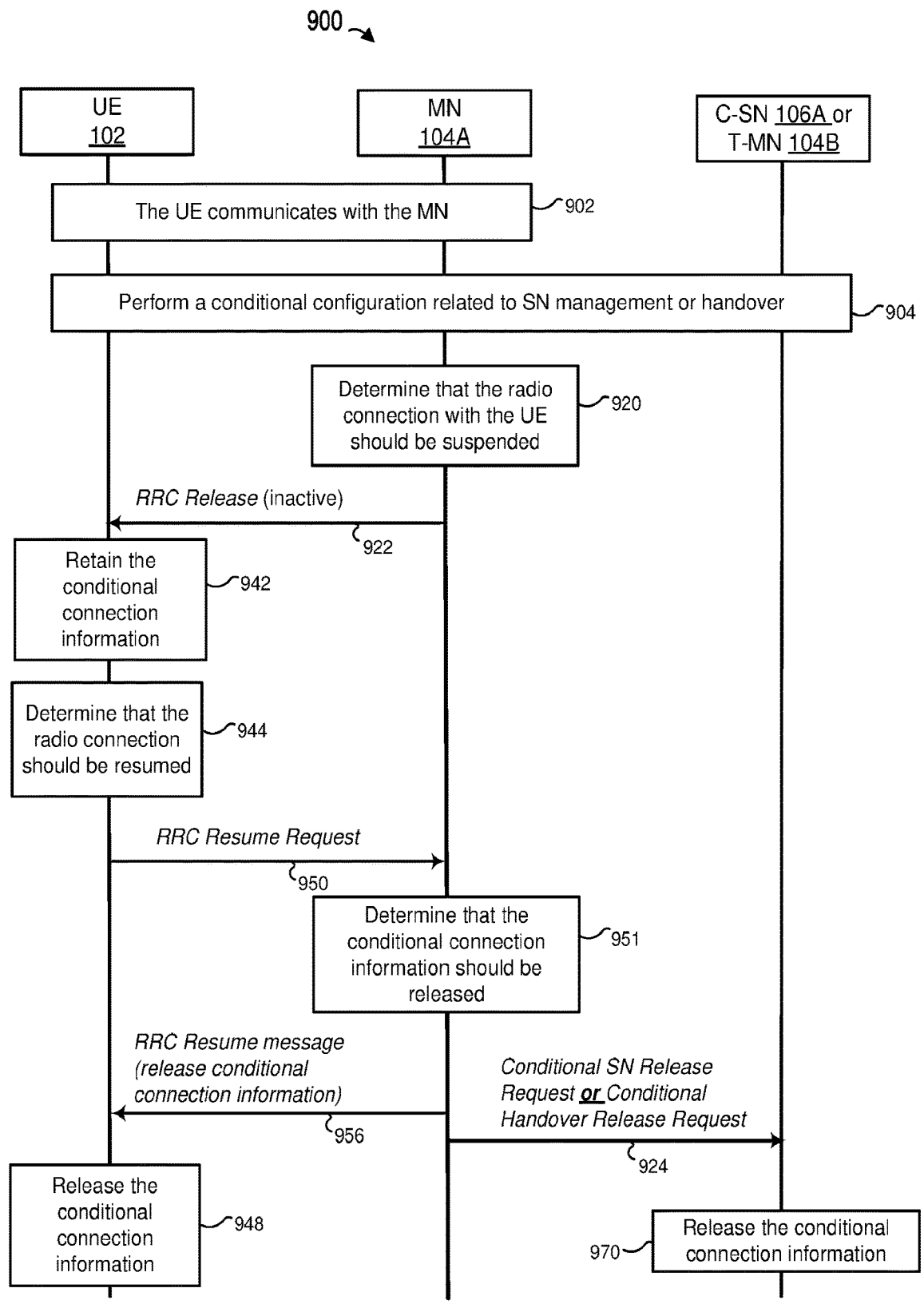
FIG. 9 is a messaging diagram of a scenario in which a UE receives conditional connection information pertaining to SN management or handover, suspends the radio connection with an MN or S-MN, and releases the conditional connection information in response to an indication from the MN or S-MN that that the radio connection is resumed, and that the conditional connection information is to be released.

Now referring to FIG. 9, the base station 104A in a scenario 900 operates as an MN and the base station 106A operates as a C-SN or a SN ((C-)SN), or the base station 104B operates as a T-MN. Similar events are labeled using similar reference numbers in FIGS. 8 and 9 (e.g., events 904, 920, 922, and 942 are similar to events 804, 820, 822, and 842), and the differences between these two scenarios are discussed below. The UE 102 later determines 944 that the radio connection should be resumed and initiates an RRC resume procedure with the MN 104. The UE transmits 950 an RRC resume request to the MN 104A.

After receiving 950 the RRC resume request message from the UE 102, the MN 104A decides 951 to release the C-SN configuration or conditional handover configuration. In response to this decision, the MN 104A transmits 956 an RRC resume message including an indication to release the conditional connection information (e.g., an C-SN release indication or conditional handover release indication) to the UE 102 and/or transmits 924 a Conditional SN Release Request or Conditional Handover Release to the C-SN 106A. In response receiving 956 an RRC resume message with an C-SN release indication, the UE 102 releases the C-SN configuration or the conditional handover configuration. In response to receiving 924 a Conditional SN release Request message, the C-SN 106A releases 970 the C-SN configuration or the conditional handover configuration. In response to receiving 924 a Conditional Handover Release message, the T-MN 104B releases 970 the conditional handover configuration.

In one scenario, the MN 104A decides to release C-SN configuration or conditional handover configuration and transmits 924 the Conditional SN Release Request or Conditional Handover Release to the C-SN 106A or T-MN 104B in response configuring the UE 102 to transition to an inactive state. The MN 104A transmits 924 Conditional SN Release Request or Conditional Handover Release to the C-SN 106A or the T-MN 104B before receiving 950 the RRC resume message from the UE 102.

In one example, the MN 104A decides to retain the C-SN configuration or conditional handover configuration. In response to this decision, the MN 104A does not include an indication to release conditional connection information in the RRC resume message and does not transmit the 1310 Conditional SN Release Request or Conditional Handover Release.

In one implementation, the MN 104A decides to retain the conditional SN or handover configuration. In response to this decision, the MN 104A includes a retain or "keep" indication instead of including a release indication in the RRC resume message at event 956 and does not transmit 924 the Conditional SN Release Request or Conditional Handover Release. After receiving 956 the RRC resume message including the "keep" indication, the UE 102 does not release the conditional SN or handover configuration.

In another scenario, the MN 104A decides to release C-SN or handover configuration. In response to this decision, the MN 104A does not include a keep indication and instead includes release indication in the RRC resume message (event 956) and transmits 924 the Conditional SN Release Request or Conditional Handover Release. After receiving 956 the RRC resume message with a release indication, the UE 102 releases the conditional SN or handover configuration.

In one scenario, the MN 104A decides 951 to release the C-SN configuration due having allocated the same C-SN configuration (e.g., SR configuration or random access configuration) to another UE. In another scenario, the MN 104 decides 951 to release the C-PSCell configuration because it cannot exchange messages with the C-SN 106A (e.g., the C-SN 106A has powered off). The MN 104A can decide 951 to release a conditional handover configuration for similar reasons.

In one embodiment, the MN 102 transmits 956 an RRC setup message (e.g., an RRCSetup or an RRCConnectionSetup), or an RRC release message to the UE 102 and transmits 924 Conditional SN Release Request or Conditional Handover Request to the C-SN 106A or T-MN 104B in response to the release configuration decision at event 951. In response to the receiving 956 the RRC setup message, or the RRC release message, the UE 102 releases 948 the conditional SN or handover configuration.

Figure 10:
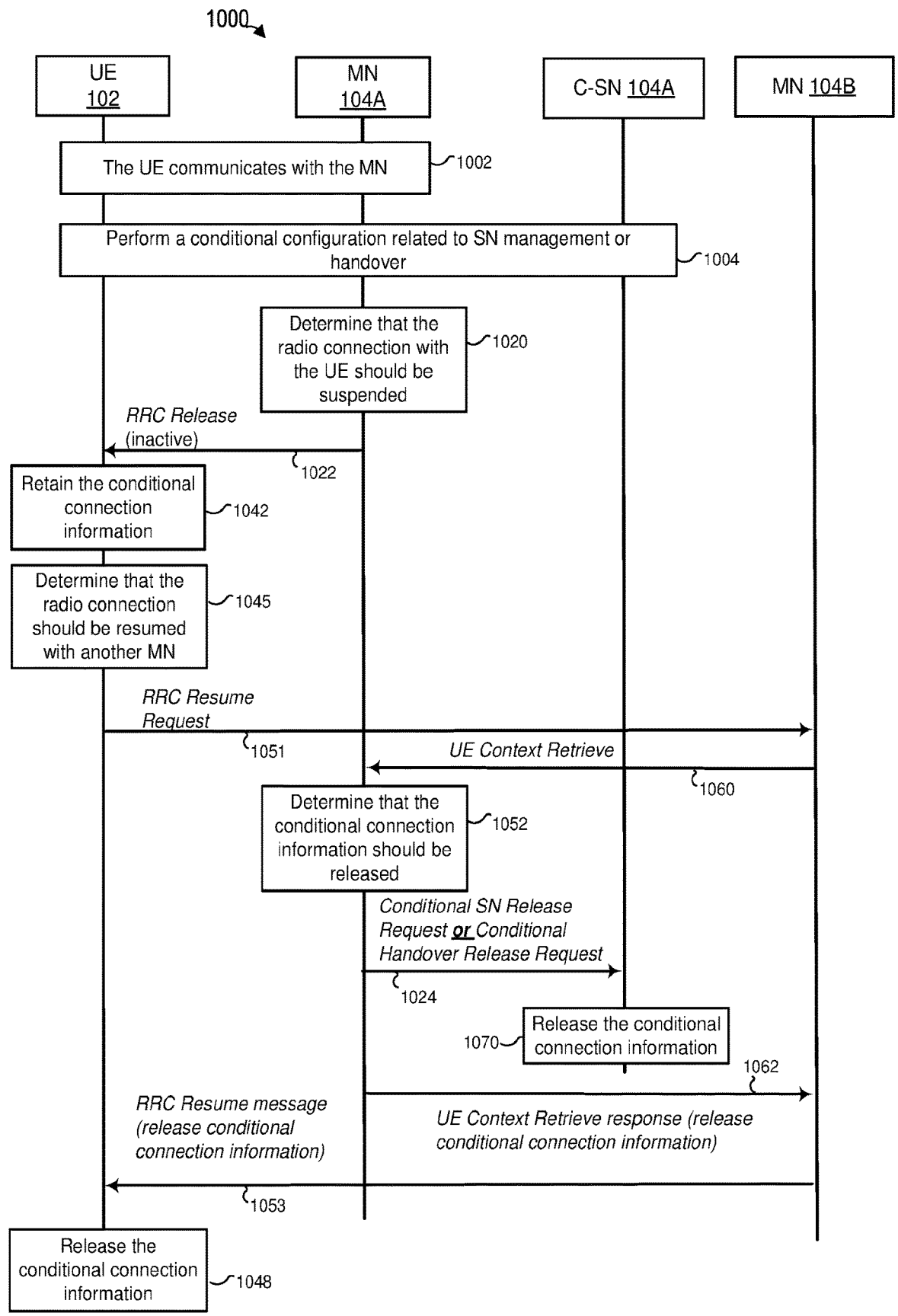
FIG. 10 is a messaging diagram of a scenario in which a UE receives conditional connection information pertaining to SN management or handover, suspends the radio connection with an MN or S-MN, and releases the conditional connection information in response to an indication from the (C-)SN or the C-MN that that the radio connection is resumed, and that the conditional connection information is to be released.

FIG. 10 illustrates a scenario 1000 in which the base station 104A operates as an MN and the base station 106A operates as a C-SN or a SN ((C-)SN), or the base station 104B operates as a T-MN. Similar events are labeled using similar reference numbers in FIGS. 9 and 10, events 1002, 1004, 1020, and 1022 are similar to events 902, 9004, 920, and 922 discussed above.

The UE 102 in this case moves 1045 to a second MN 104B and determines to perform an RRC resume procedure with the MN 104B. In response to the decision, the UE 102 transmits 1051 a RRC resume request message to the MN 104B.

After receiving 1051 the RRC resume request message from the UE 102, the MN 104B transmits 1060 a UE context retrieve message to the MN 104A to acquire the UE context. In response to this request, the MN 104A decides 1052 to release the C-SN configuration or the conditional handover configuration. In response to the decision, the MN 104A transmits 1024 a Conditional SN Release Request or Conditional Handover Release message to the C-SN 106A and transmits 1062 a UE context retrieve response including an C-SN release indication to the MN 104B.

After receiving the 1024 the Conditional SN release Request message, the C-SN 106A releases 1070 the C-SN configuration or conditional handover configuration. After receiving 1062 the UE context retrieve response including a release indication, the MN 104B transmits 1053 an RRC resume message including a release indication to the UE 102. In response, the UE 102 releases 1048 the C-SN configuration.

In one implementation, the UE context retrieve response (event 1062) does not include an SN release or conditional handover indication but includes an UE Inactive AS context of the UE 102 and/or C-SN configuration of the UE 102. The MN includes the SN release or conditional handover release indication in the RRC resume message (event 1053) if the MN 104B decides to release the C-SN or conditional handover configuration. The MN 104B does not include the release indication in the RRC resume message (event 1053) if the MN 104B decides to retain the C-SN configuration.

In some implementations, the MN 104B and MN 104A are same MN. In this case, the UE 102 and the MN 104A can decide to keep the C-SN configuration in response to the RRC resume decision and procedure.

Figure 11:
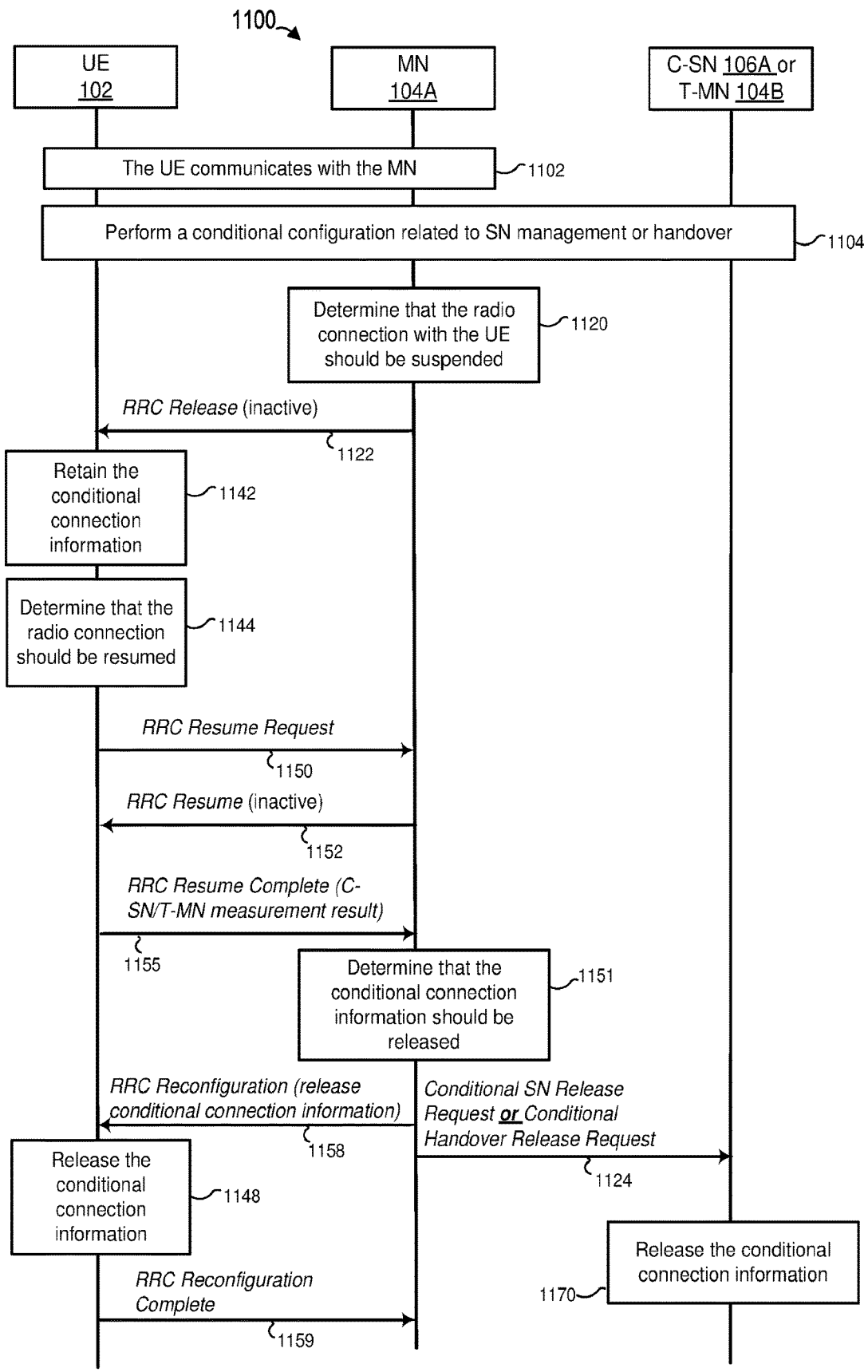
FIG. 11 is a messaging diagram of a scenario in which a UE receives conditional connection information pertaining to SN management or handover, suspends the radio connection with an MN or S-MN, and releases the conditional connection information in response to an indication from the MN or S-MN that the radio connection is to be reconfigured, and that the conditional connection information is to be released.

FIG. 11 illustrates a scenario 1100 generally similar to the scenario 800 discussed with reference to FIG. 8, and similar events are labeled using similar reference numbers in FIGS. 8 and 11. However, in this case the MN 104A receives 1155 a measurement result related to the C-SN 104A or T-MN 104B, in an RRC Resume Complete message, and determines 1151 that the conditional connection should be released. The MN 104A accordingly releases 1158, 1124 the conditional connection information. In particular, the MN 104A transmits 1158 an RRC Reconfiguration message including a release indication to the UE 102 and receives 1159 an RRC Reconfiguration Complete message in response.

Figure 12:
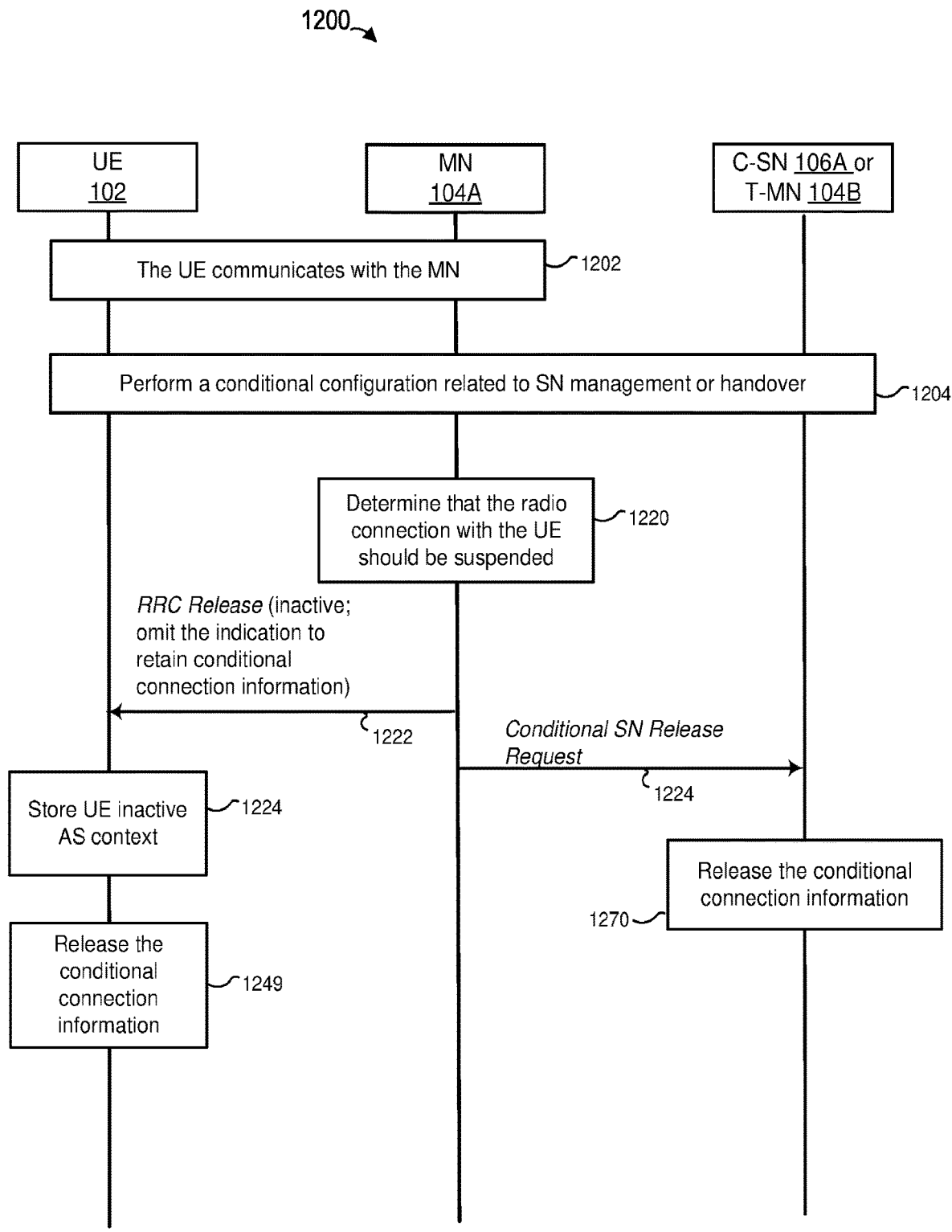
FIG. 12 is a messaging diagram of a scenario in which a UE receives conditional connection information pertaining to SN management or handover, suspends the radio connection with an MN or S-MN, and releases the conditional connection information in response to a command to release the radio connection, the command omitting an indication that the conditional connection information should be retained.

FIG. 12 illustrates a scenario 1200 generally similar to the scenario 700. Similar events are labeled using similar reference numbers in FIGS. 7 and 12. In this scenario, however, the MN 104A sends 1222 an RRC Release message and omits an indication that the conditional connection information should be retained. The UE 102 accordingly releases 1249 the conditional connection information.

Figure 13:
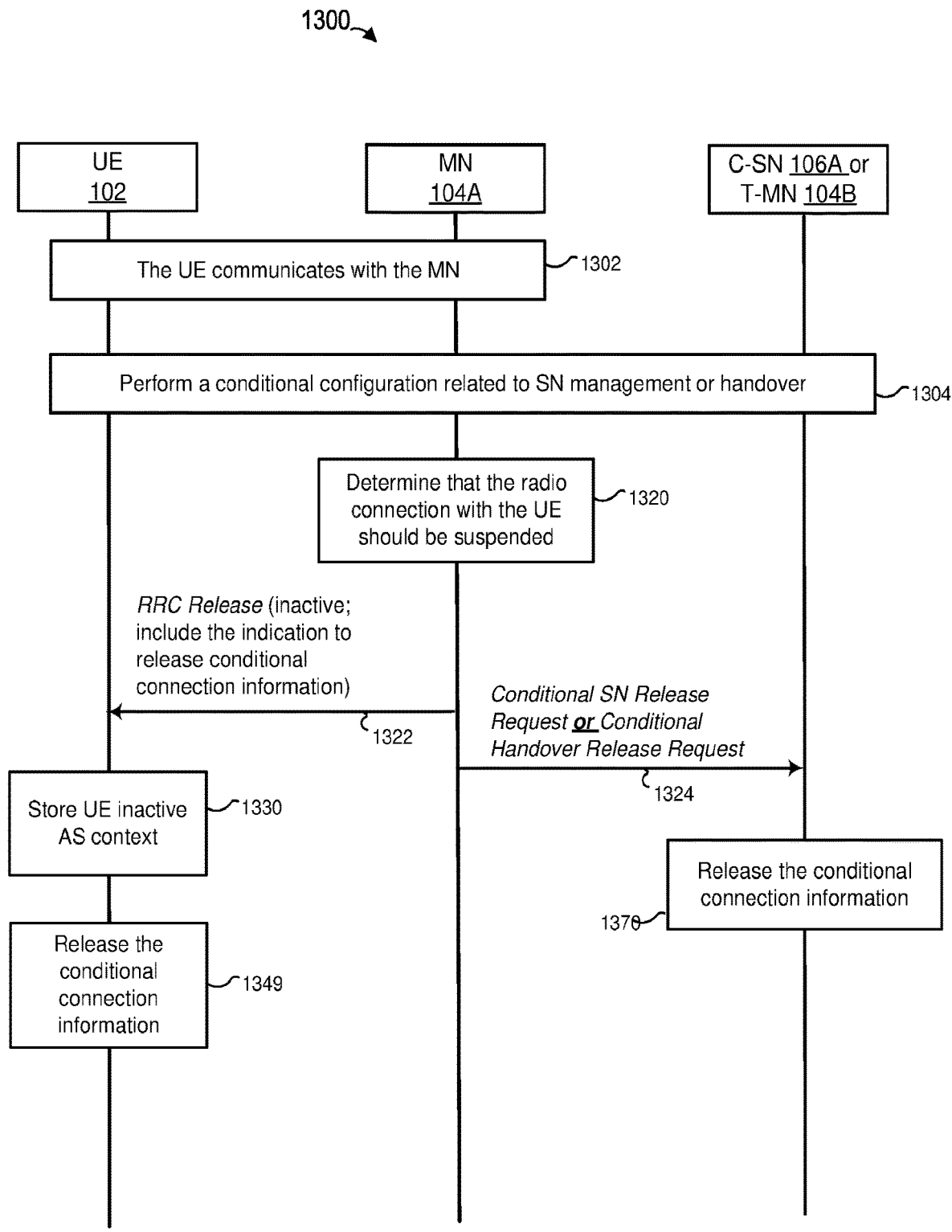
FIG. 13 is a messaging diagram of a scenario in which a UE receives conditional connection information pertaining to SN management or handover, suspends the radio connection with an MN or S-MN, and releases the conditional connection information in response to a command to release the radio connection, the command including an indication that the conditional connection information should be released.

Now referring to FIG. 13, events similar to those of FIGS. 7-12 are labeled using similar reference numbers. In a scenario 1300, the MN 104A sends 1322 an RRC Release message and includes an explicit indication that the conditional connection information should be released. The UE 102 accordingly releases 1349 the conditional connection information.

Figure 14:
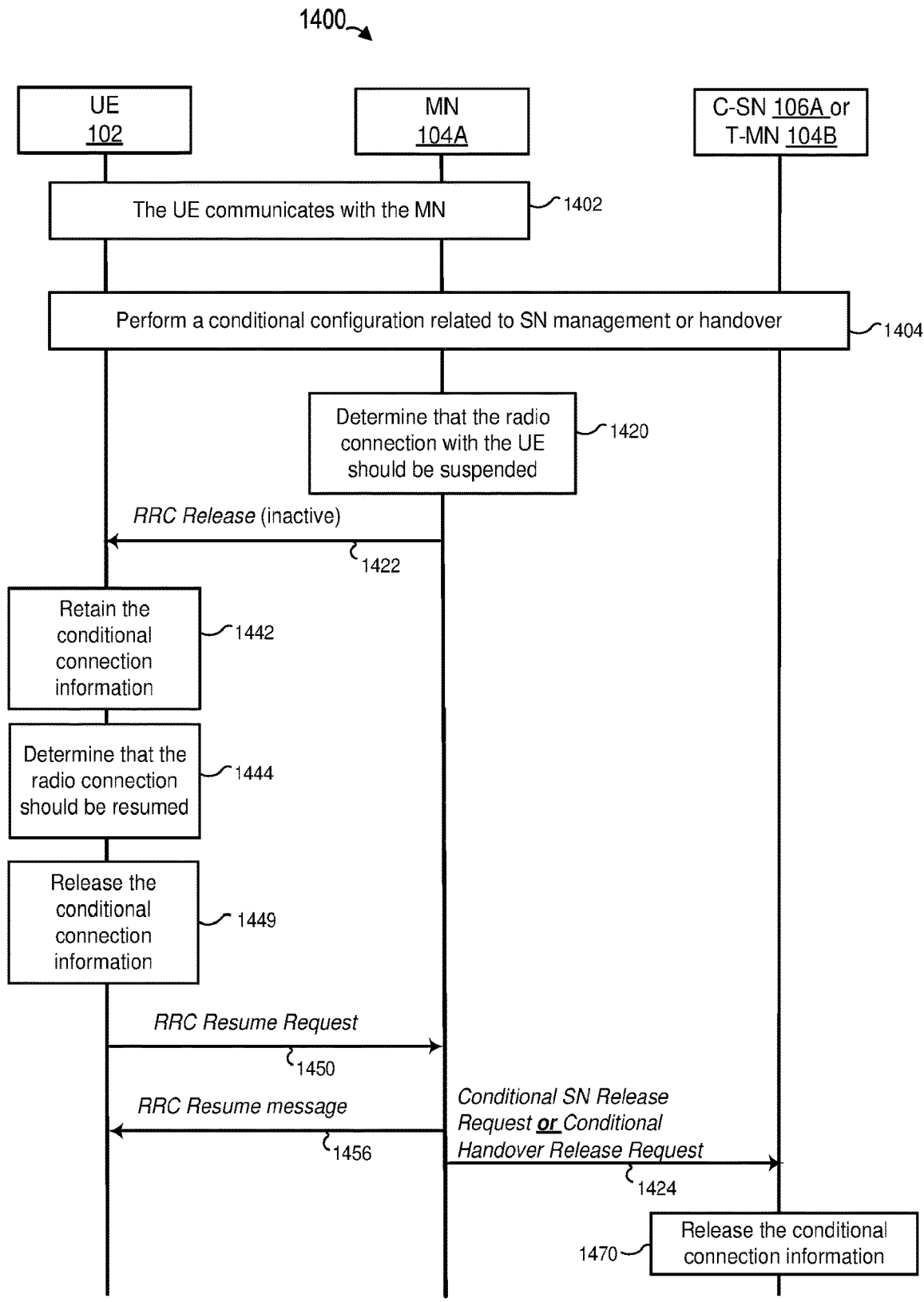
FIG. 14 is a messaging diagram of a scenario in which a base station, operating as an MN in conditional SN management scenarios or a source MN (S-MN) in conditional scenarios, determines that the UE should suspend the radio connection with the base station and notifies another base station, operating respectively as an SN or a target MN, that conditional connection information should be released, in response to request from the UE to resume the radio connection.

FIG. 14 illustrates another scenario 1400, and events similar to those of FIGS. 7-13 are labeled using similar reference numbers. According to the scenario 1400, the MN 104A sends 1424 a Conditional Release Request or a Conditional Handover Release in response to receiving 1450 a request from the UE 102 to resume the radio connection, rather than earlier as in the scenario 1300, for example.

Figure 15:
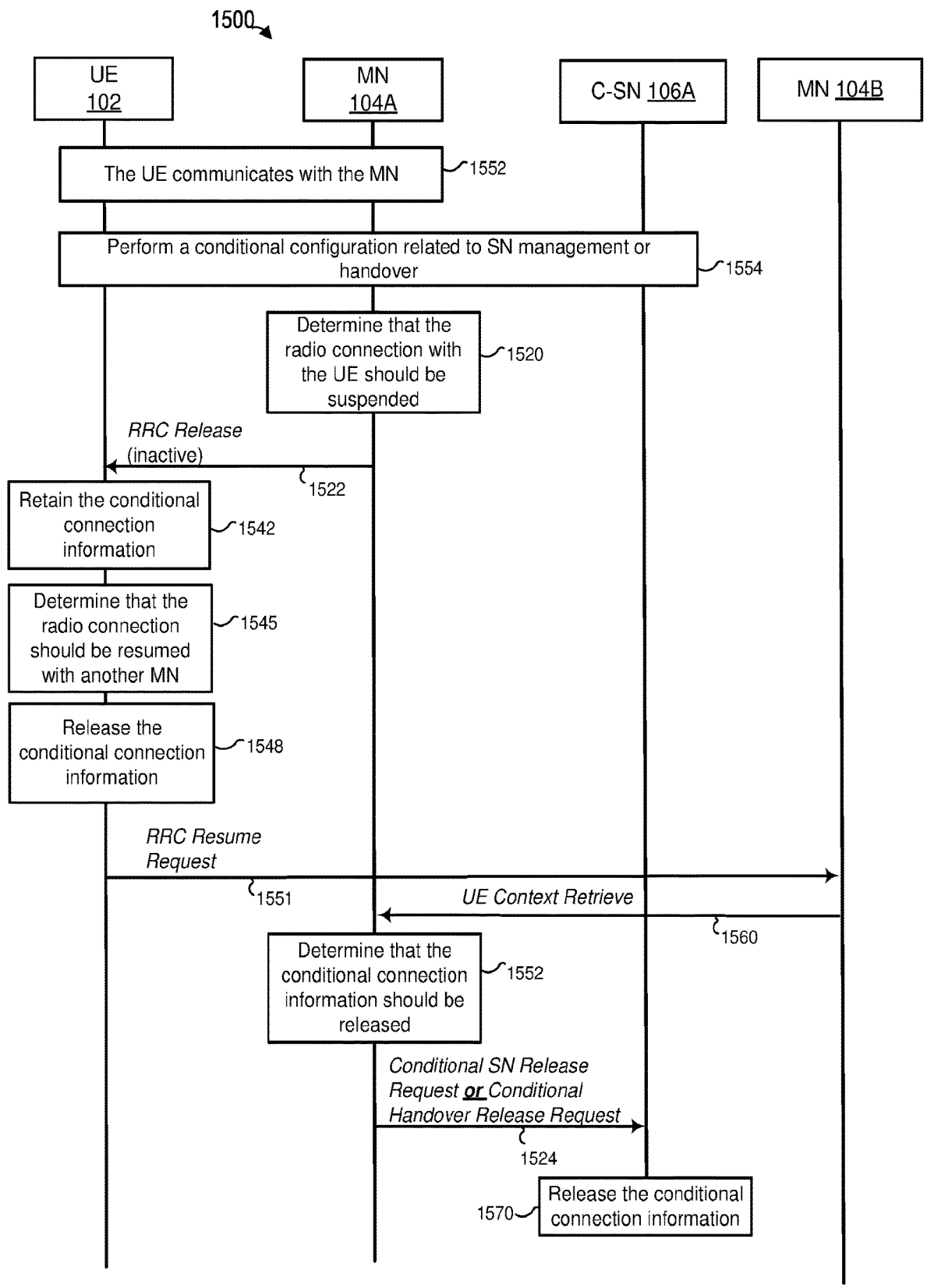
FIG. 15 is a messaging diagram of a scenario in which a base station, operating as an MN in conditional SN management scenarios or a source MN (S-MN) in conditional scenarios, determines that the UE should suspend the radio connection with the base station and notifies another base station, operating respectively as an SN or a target MN, that conditional connection information should be released, in response to a request for the context of the UE received from another, third base station.

In FIG. 15, events similar to those of FIGS. 7-14 are labeled using similar reference numbers. According to a scenario 1500, the MN 104A sends 1524 a Conditional Release Request or a Conditional Handover Release in response to receiving 1560 a request from the MN 104B to retrieve a context of the UE 102.

Figure 16:
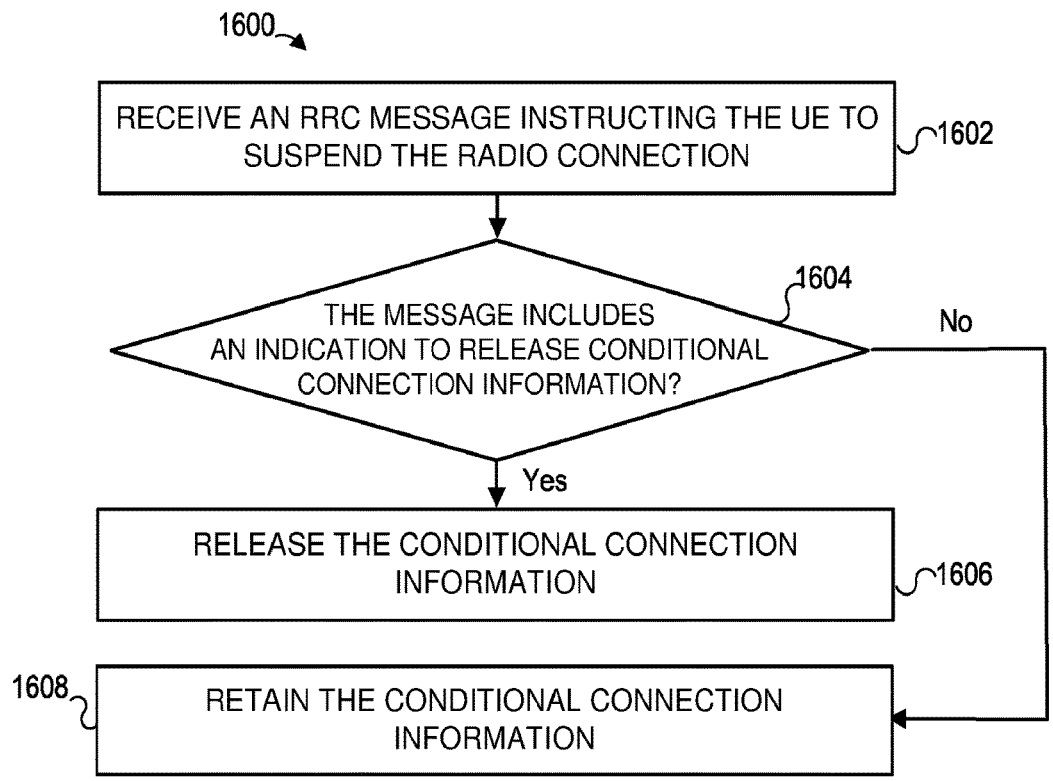
FIG. 16 is a flow diagram of an example method for managing conditional connection information in accordance with an indication received from the MN or S-MN, which can be implemented in the UE of FIG. 1.

FIG. 16 is a flow diagram of an example method 1600 for managing conditional connection information in accordance with an indication received from the MN or S-MN, which can be implemented in the UE 102 of FIG. 1 or another suitable device. For clarity, the method 1600 is discussed with example reference to the UE 102.

At block 1602, the UE 102 receives an RRC message instructing the UE 102 to suspend the radio connection (see event 722 of FIG. 7, event 822 of FIG. 8, event 922 of FIG. 9, event 1022 of FIG. 10, event 1122 of FIG. 11, event 1222 of FIG. 12, event 1322 of FIG. 13, event 1422 of FIG. 14, event 1522 of FIG. 15). Next, at block 1604, the UE 102 determines whether the message includes an indication that the UE 102 should release the conditional connection information. When the message includes such an indication (see event 1342 of FIG. 13), the flow proceeds to block 1606, where the UE 102 releases the conditional connection information (see event 1349 of FIG. 13). Otherwise, when the message does not include such an indication (see event 822 of FIG. 8, event 922 of FIG. 9, event 1022 of FIG. 10, event 1122 of FIG. 11, event 1422 of FIG. 14, event 1522 of FIG. 15), the flow proceeds to block 1608, where the UE 102 retains the conditional connection information (see event 842 of FIG. 8, event 942 of FIG. 9, event 1042 of FIG. 10, event 1142 of FIG. 11, event 1542 of FIG. 15).

Figure 17:
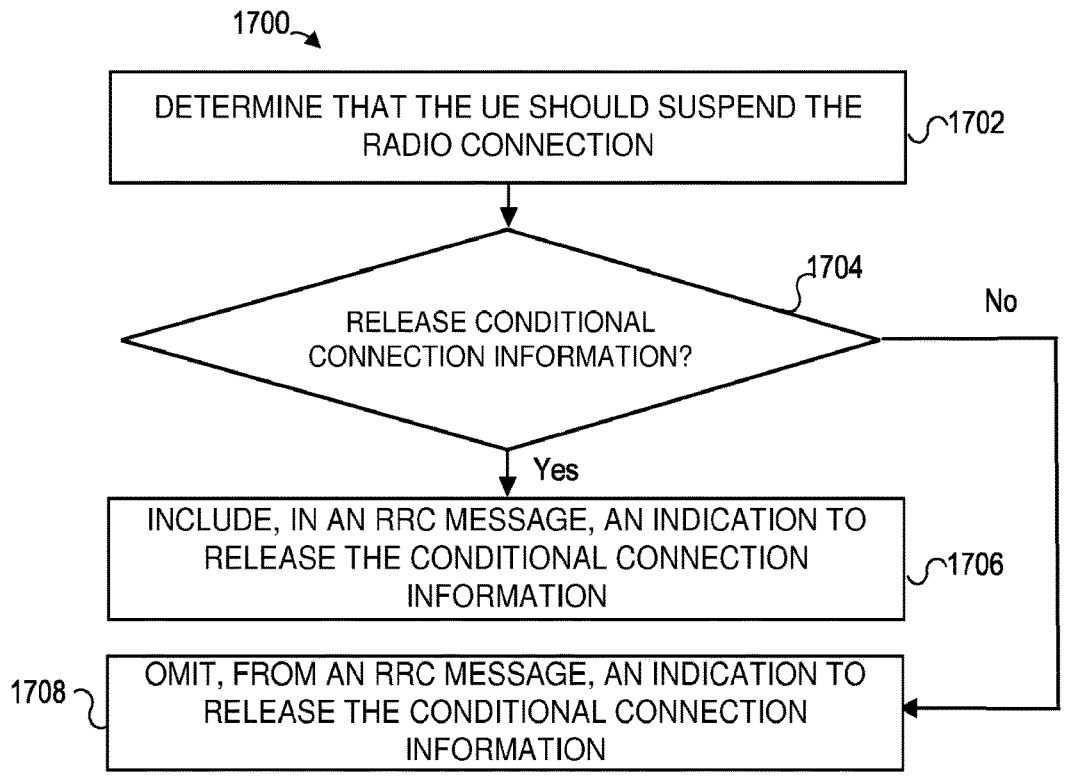
FIG. 17 is a flow diagram of an example method for managing conditional connection information at a UE using an indication of whether the UE should retain conditional connection information, which can be implemented in a base station of FIG. 1 operating as an MN or S-MN.

FIG. 17 is a flow diagram of an example method 1700 for managing conditional connection information at a UE using an indication of whether the UE should retain conditional connection information, which can be implemented in a base station of FIG. 1 operating as an MN or S-MN. At block 1702, the base station determines that the UE should suspend the radio connection with the base station (see event 720 of FIG. 7, event 820 of FIG. 8, event 920 of FIG. 9, event 1020 of FIG. 10, event 1120 of FIG. 11, event 1220 of FIG. 12, event 1320 of FIG. 13, event 1420 of FIG. 14, event 1520 of FIG. 15). Next, at block 1704, the base station determines whether the base station should release the conditional connection information with which the UE was configured, and proceeds to block 1706 (yes) or block 1708 (no). At block 1706, the base station includes an indication that the UE should release the conditional connection information in an RRC message (see event 1342 of FIG. 13). On the other hand, at block 1708, the base station generates an RRC message and omits, from the RRC message, an indication that the UE should release the conditional connection information (see event 822 of FIG. 8, event 922 of FIG. 9, event 1022 of FIG. 10, event 1122 of FIG. 11, event 1422 of FIG. 14, event 1522 of FIG. 15).

Figure 18:
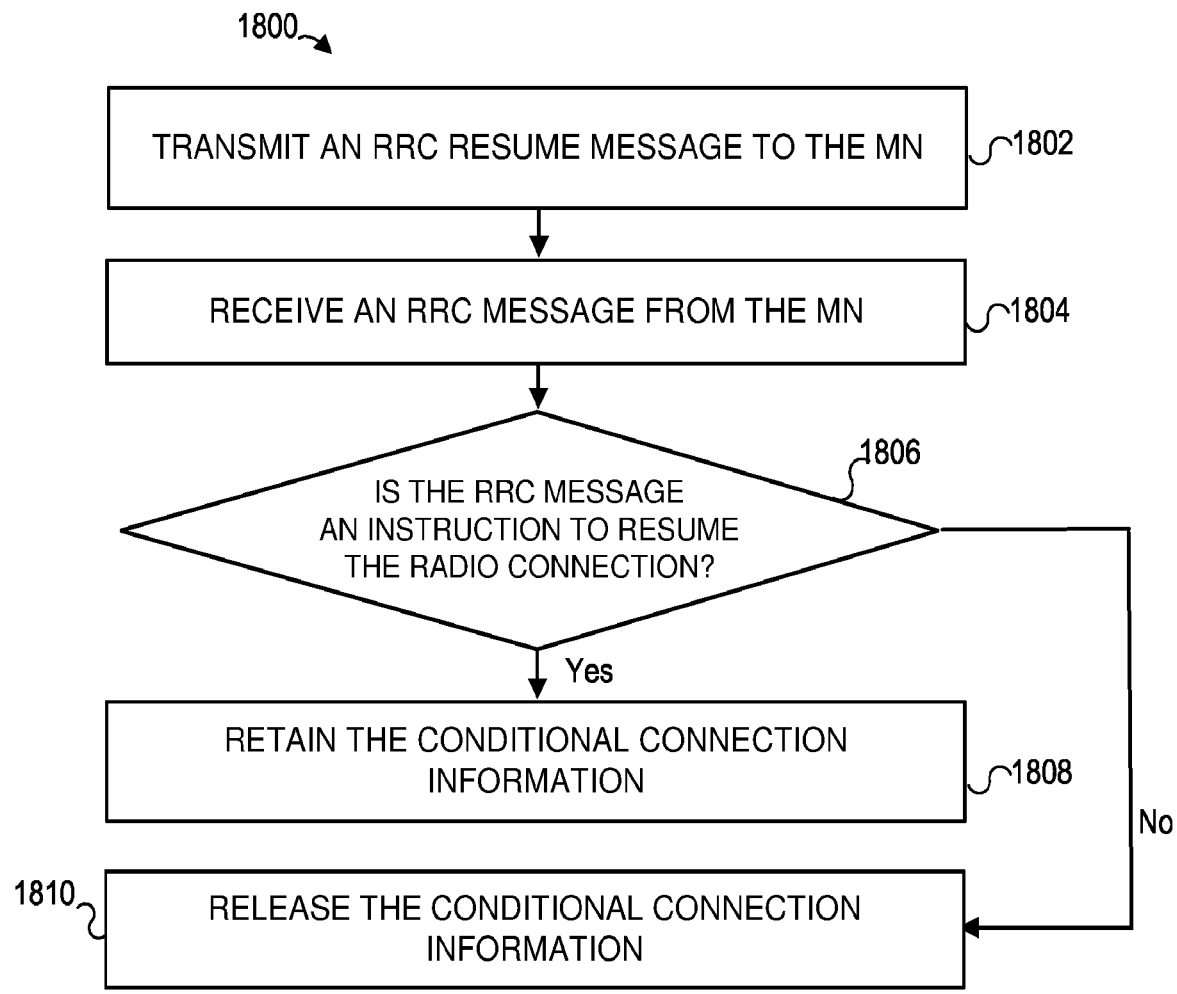
FIG. 18 is a flow diagram of an example method for managing conditional connection information in accordance with whether the MN or S-MN has resumed a previously suspended radio connection, which can be implemented in the UE of FIG. 1.

FIG. 18 is a flow diagram of an example method 1800 for managing conditional connection information in accordance with whether the MN or S-MN has resumed a previously suspended radio connection, which can be implemented in the UE of FIG. 1. At block 1802, the UE transmits a request to resume a suspended radio connection to the MN. At block 1804, the UE receives an RRC message in response. If the UE determines at block 1806 that the RRC message is an instruction to resume the radio connection, the flow proceeds to block 1808. Otherwise, if the UE determines at block 1806 that the RRC message is not an instruction to resume the radio connection, the flow proceeds to block 1810. At block 1808, the UE retains the conditional connection information. At block 1810, the UE releases the conditional information.

Figure 19:
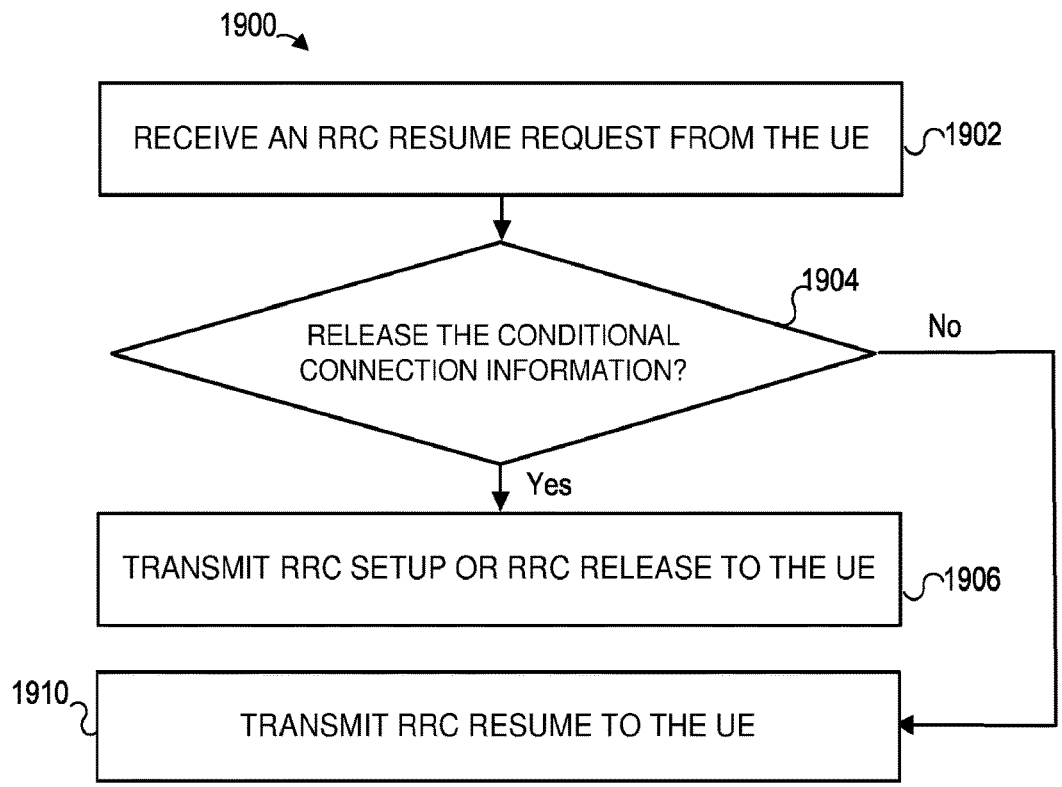
FIG. 19 is a flow diagram of an example method for managing conditional connection information at a UE when the UE requests that a previously suspended radio connection be resumed, which can be implemented in a base station of FIG. 1 operating as an MN or S-MN.

FIG. 19 is a flow diagram of an example method 1900 for managing conditional connection information at a UE when the UE requests that a previously suspended radio connection be resumed, which can be implemented in a base station of FIG. 1 operating as an MN or S-MN. At block 1902, the base station receives a request to resume a suspended radio connection (e.g., an RRC Resume Request message), from a UE. If the base station at block 1904 determines that the base station should release the conditional connection information, the flow proceeds to block 1906, where the base station transmits an RRC Setup message or RRC Release message to the UE. Otherwise, if the base station at block 1904 determines that the base station should not release the conditional connection information, the flow proceeds to block 1910, where the base station transmits an RRC Resume message to the UE.

Figure 20:
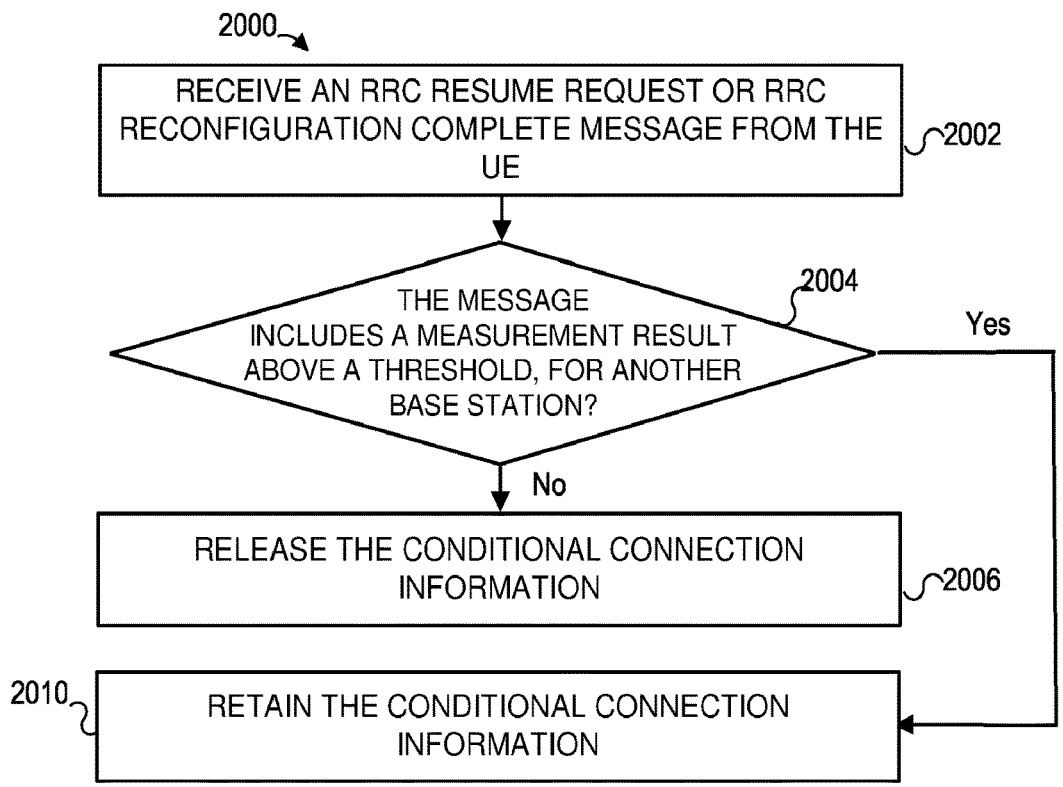
FIG. 20 is a flow diagram of an example method for managing conditional connection information at a UE in accordance with a measurement result pertaining to the C-SN or C-MN, which can be implemented in a base station of FIG. 1 operating as an MN or S-MN.

FIG. 20 is a flow diagram of an example method 2000 for managing conditional connection information at a UE in accordance with a measurement result pertaining to the C-SN or C-MN, which can be implemented in a base station of FIG. 1 operating as an MN or S-MN. At block 2002, the base station receives, from a UE, an RRC Resume Request message or an RRC Reconfiguration Complete message. If the base station at block 2004 determines that the message does not include a measurement result above a threshold value, related to another base station, the flow proceeds to block 2006, where the base station releases the conditional connection information. Otherwise, if the base station at block 2004 determines that the message includes a measurement result above a threshold value, the flow proceeds to block 2010, where the base station retains the conditional connection information.

Figure 21:
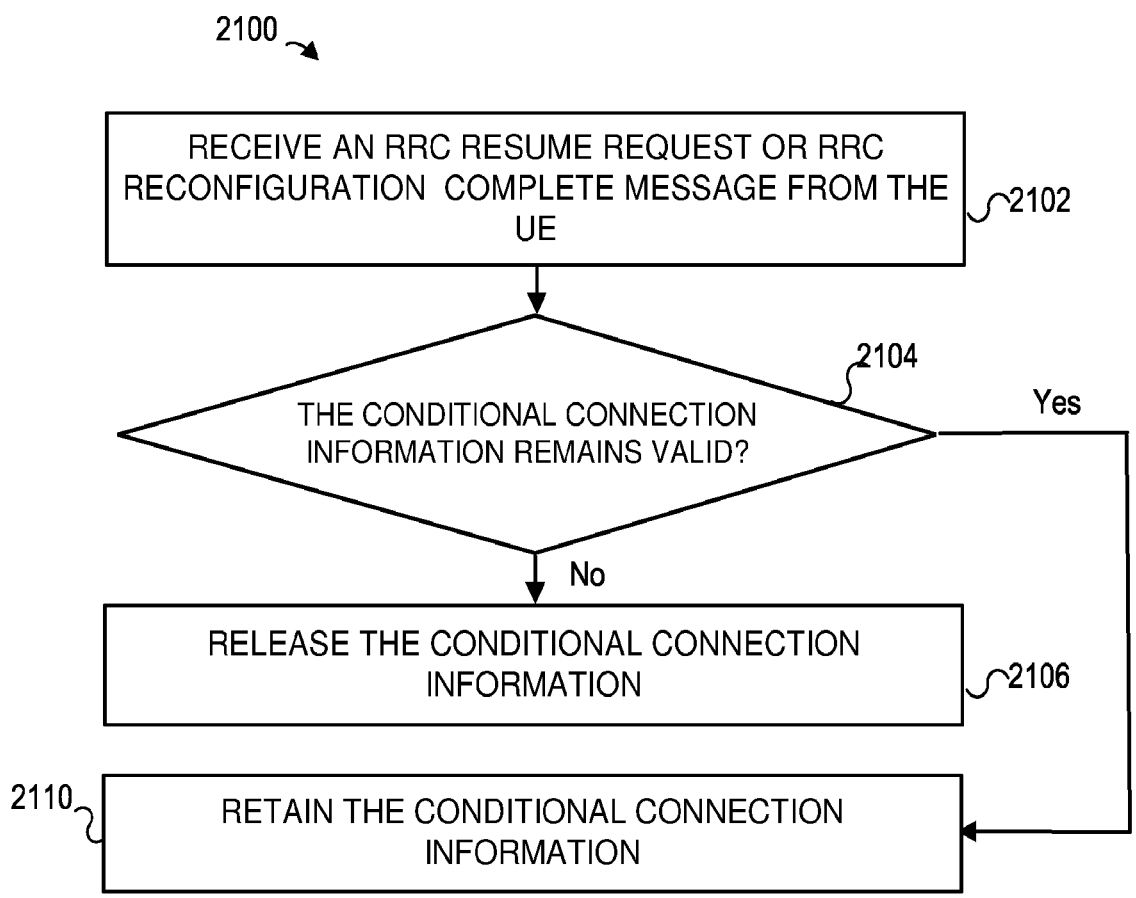
FIG. 21 is a flow diagram of an example method for managing conditional connection information in accordance with whether the conditional connection information is still valid when the UE has resumed a previously suspended radio connection, which can be implemented in the MN of FIG. 1.

FIG. 21 is a flow diagram of an example method 2100 for managing conditional connection information in accordance with whether the conditional connection information is still valid when the UE has resumed a previously suspended radio connection, which can be implemented in the MN of FIG. 1. At block 2102, the base station receives, from a UE, an RRC Resume Request message or an RRC Reconfiguration Complete message. If the base station at block 2104 determines that the conditional connection information is not valid, the flow proceeds to block 2106, where the base station releases the conditional connection information. Otherwise, if the base station at block 2104 determines that the conditional connection information is still valid, the flow proceeds to block 2110, where the base station retains the conditional connection information.

Figure 22:
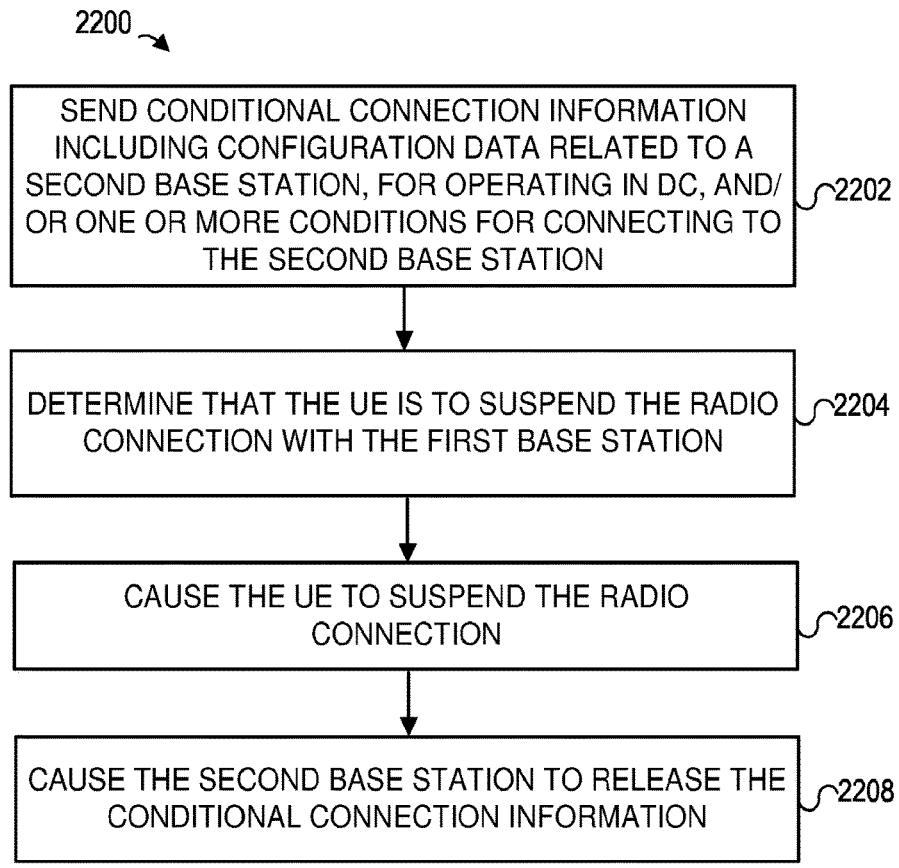
FIG. 22 is a flow diagram of an example method for managing a conditional operation related to a UE, which can be implemented in a base station of FIG. 1.

FIG. 22 is a flow diagram of an example method 2200 for managing a conditional operation related to a UE, which can be implemented in a base station of FIG. 1. At block 2202, the (first) base station sends conditional connection information to the UE (see procedure 704 of FIG. 7). The conditional connection information can include configuration data related to another (second) base station, so that the UE can communicate in DC with the first base station and the second base station, and/or one or more conditions for connecting to the second base station.

At block 2204, the first base station determines that the UE should suspend the radio connection with the first base station (see event 720 of FIG. 7, event 920 of FIG. 9, event 1020 of FIG. 10, event 1120 of FIG. 11, event 1220 of FIG. 12, event 1320 of FIG. 13, event 1420 of FIG. 14, event 1520 of FIG. 15). Next, at block 2206, the first base station causes the UE to suspend the radio connection (see event 722 of FIG. 7, event 922 of FIG. 9, event 1022 of FIG. 10, event 1122 of FIG. 11, event 1222 of FIG. 12, event 1322 of FIG. 13, event 1422 of FIG. 14, event 1522 of FIG. 15). At block 2208, the first base station causes the second base station to release the conditional connection information (see event 724 of FIG. 7, event 924 of FIG. 9, event 1024 of FIG. 10, event 1124 of FIG. 11, event 1224 of FIG. 12, event 1324 of FIG. 13, event 1424 of FIG. 14, event 1524 of FIG. 15).

Figure 23:
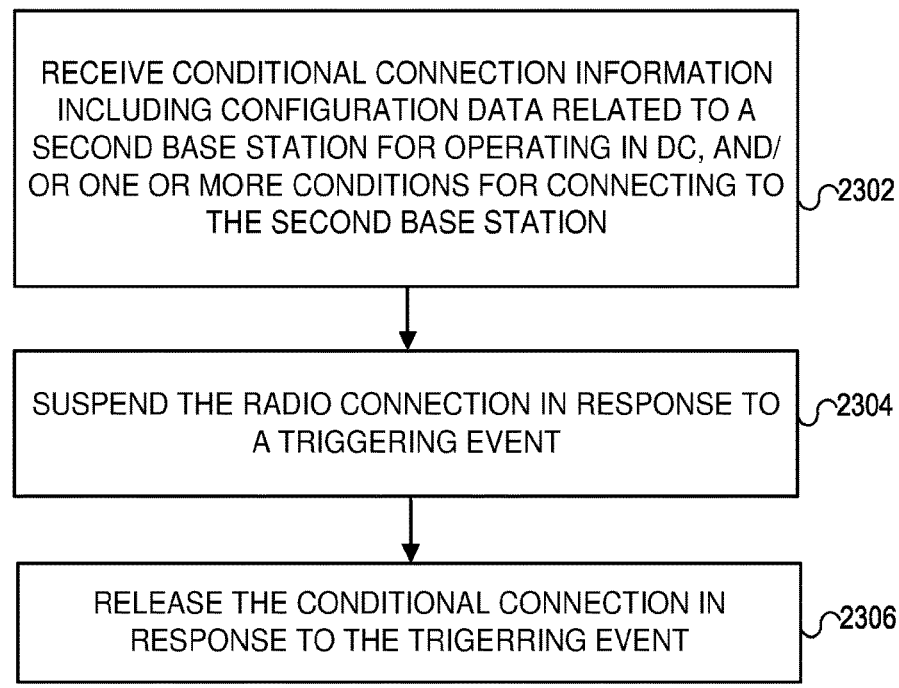
FIG. 23 is a flow diagram of an example method for managing a conditional operation related to a second base station, which can be implemented in the UE of FIG. 1.

FIG. 23 is a flow diagram of an example method 2300 for managing a conditional operation related to a second base station, which can be implemented in the UE of FIG. 1. At block 2302, the UE receives conditional connection information from a first base station (see procedure 704 of FIG. 7, procedure 1204 of FIG. 12). The conditional connection information can include configuration data related to a second base station, so that the UE can communicate in DC with the first base station and the second base station. The conditional connection information also can include one or more conditions for connecting to the second base station. At block 2304, the UE suspends the radio connection in response to a triggering event, such as a command from the first base station (see event 722 of FIG. 7, event 1222 of FIG. 12). At block 2306, the UE releases the conditional connection information in response to the triggering event (see event 748 of FIG. 7, event 1249 of FIG. 12).

Figure 24:
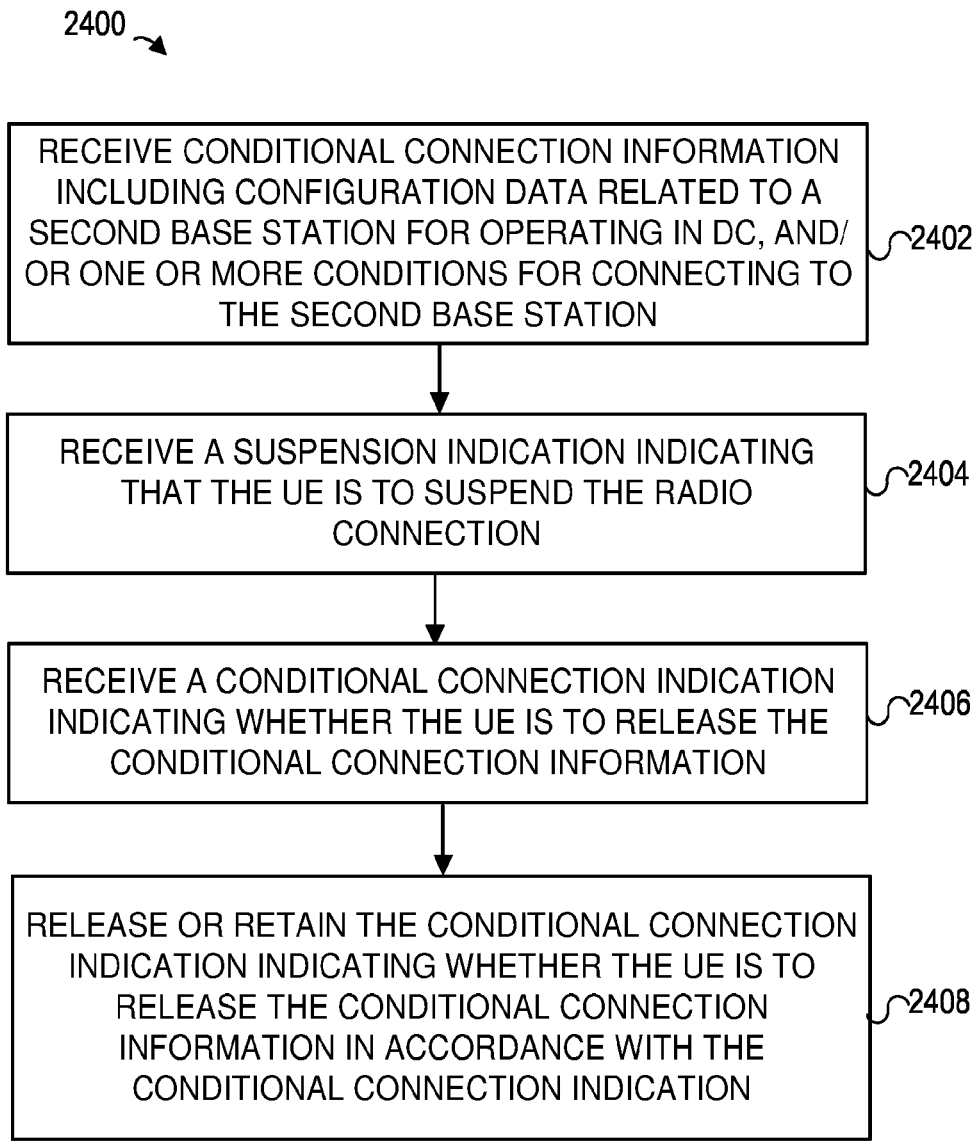
FIG. 24 is a flow diagram of another example method for managing a conditional operation related to a second base station, which can be implemented in the UE of FIG. 1.

FIG. 24 is a flow diagram of another example method 2400 for managing a conditional operation related to a second base station, which can be implemented in the UE of FIG. 1. At block 2402, the UE receives conditional connection information from a first base station (see procedure 904 of FIG. 9, procedure 1004 of FIG. 10, procedure 1104 of FIG. 11, procedure 1204 of FIG. 12, procedure 1304 of FIG. 13). The conditional connection information can include configuration data related to a second base station, so that the UE can communicate in DC with the first base station and the second base station. The conditional connection information also can include one or more conditions for connecting to the second base station.

Next, at block 2404, the UE receives a suspension indicating that the UE is to suspend the radio connection (see event 922 of FIG. 9, event 1022 of FIG. 10, event 1122 of FIG. 11, event 1222 of FIG. 12, event 1322 of FIG. 13). At block 2406, the UE receives a condition connection indication indicating whether the UE should release the condition connection information (see event 956 of FIG. 9, event 1053 of FIG. 10, event 1158 of FIG. 11, event 1222 of FIG. 12, event 1322 of FIG. 13). At block 2406, the UE releases or retains the conditional connection information in accordance with the indication (see event 948 of FIG. 9, event 1048 of FIG. 10, event 1148 of FIG. 11, event 1249 of FIG. 12, event 1349 of FIG. 13).

ADDITIONAL CONSIDERATIONS

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Aspect 1. A method in a first base station for managing a conditional operation related to a user equipment (UE), the method comprising: sending, by processing hardware to the UE, a conditional connection information including at least one of a (i) configuration data related to a second base station or (ii) one or more conditions for connecting to the second base station; and in response to determining, by the processing hardware, that the UE is to suspend a radio connection with the first base station: causing the UE to suspend a radio connection with the first base station, and causing the second base station to release the conditional connection information.

Aspect 2. The method of aspect 1, wherein the conditional connection information pertains to connecting the UE to the second base station in order for the UE to operate in dual connectivity with the first base station and the second base station.

Aspect 3. The method of aspect 2, wherein causing the second base station to release the conditional connection information includes sending, to the second base station, a request to release a conditional secondary node (SN) configuration at the second base station.

Aspect 4. The method of aspect 1, wherein the conditional connection information pertains to a handover from the first base station to the second base station.

Aspect 5. The method of aspect 4, wherein causing the second base station to release the conditional connection information includes sending, to the second base station, a request to release a conditional handover configuration at the second base station.

Aspect 6. The method of any of aspects 1-5, further comprising: sending, to the UE via a radio interface, a message indicating that the UE is to release the conditional connection information.

Aspect 7. The method of aspect 6, wherein the message includes a field that indicates that the UE is to release the conditional connection information.

Aspect 8. The method of aspect 6, wherein the message omits a field that indicates that the UE is to retain the conditional connection information.

Aspect 9. The method of any of aspects 1-5, wherein causing the UE to suspend the radio connection includes: sending to the UE a message associated with a protocol for controlling radio resources, the message indicating that the UE is to transition to (i) an inactive mode associated with the protocol or (ii) an idle mode associated with the protocol, with the radio connection suspended.

Aspect 10. The method of aspect 9, wherein the message is a first message; the method further comprising: receiving from the UE a request to resume the suspended radio connection; and sending, to the UE in response to the request, a second message associated with the protocol for controlling radio resources, the second message indicating that the UE is to (i) resume the radio connection and (ii) release the conditional connection information.

Aspect 11. The method of any of aspects 1-9, wherein causing the second base station to release the conditional connection information includes sending, to the second base station via an inter-base-station interface, an indication that the second base station is to release the conditional connection information.

Aspect 12. The method of aspect 11, including sending the indication in response to receiving a request from the UE to resume the radio connection.

Aspect 13. The method of aspect 11, including sending the indication shortly before, or shortly after, causing the UE to suspend the radio connection.

Aspect 14. The method of aspect 11, including sending the indication in response to receiving, from a third base station, a request to retrieve a context for the UE.

Aspect 15. A base station comprising processing hardware and configured to implement a method of any of aspects 1-14.

Aspect 16. A method in a user equipment (UE) with a radio connection to a first base station for managing a conditional operation related to a second base station, the method comprising: receiving, by processing hardware from the first base station, a conditional connection information including at least one of a (i) configuration data related to the second base station and (ii) one or more conditions for connecting to the second base station; suspending, by the processing hardware, the radio connection in response to a triggering event; and retaining, by the processing hardware, the conditional connection information in response determining that the UE should resume the radio connection.

Aspect 17. The method of aspect 16, further comprising: resuming, by the processing hardware, the suspended radio connection; and connecting to the second base station using the configuration data, in response to determining that the one or more conditions for connecting to the second base station are satisfied.

Aspect 18. The method of aspect 17, wherein resuming the suspended radio connection includes: sending, by the processing hardware, a request to resume the suspended radio connection to the first base station; and receiving, by the processing hardware from the first base station, a message indicating that the UE is to resume the radio connection.

Aspect 19. The method of aspect 16, further comprising: in response to determining, by the processing hardware, to resume the suspended radio connection: sending, by the processing hardware, a request to resume the suspended radio connection to the first base station; and releasing, by the processing hardware, the conditional connection information.

Aspect 20. The method of aspect 16, further comprising: sending, by the processing hardware, a request to resume the suspended radio connection to the first base station; receiving, by the processing hardware, a message indicating that the UE is resume the suspended radio connection, the message including a conditional connection indication indicative of whether the UE is to release the conditional connection information; and releasing or retaining the conditional connection information in accordance with the conditional connection indication.

Aspect 21. The method of aspect 16, further comprising: determining, by the processing hardware, to resume the radio connection with a third base station; releasing, by the processing hardware, the conditional connection information; and resuming, by the processing hardware, the suspended radio connection with the third base station.

Aspect 22. The method of aspect 21, wherein the releasing the conditional connection information is in response to the determining to resume the radio connection with the third base station.

Aspect 23. The method of aspect 21, wherein the releasing the conditional connection information is in response to receiving, from the third base station, a message that the radio connection is resumed with the third base station.

Aspect 24. The method of any of aspects 16-23, wherein the conditional connection information pertains to connecting the UE to the second base station in order for the UE to operate in dual connectivity with the first base station and the second base station.

Aspect 25. The method of any of aspects 16-23, wherein the conditional connection information pertains to a handover from the first base station to the second base station.

Aspect 26. The method of aspect 20, wherein the triggering event includes receiving a message with a field that indicates that the UE is to retain the conditional connection information.

Aspect 27. The method of aspect 16, wherein the triggering event includes receiving a message in which a field that indicates that the UE is to release the conditional connection information is omitted.

Aspect 28. The method of aspect 16, wherein the triggering event includes receiving a message associated with a protocol for controlling radio resources, the message indicating that the UE is to transition to (i) an inactive mode associated with the protocol or (ii) an idle mode associated with the protocol, with the radio connection suspended.

Aspect 29. A method in a user equipment (UE) with a radio connection to a first base station for managing a conditional operation related to a second base station, the method comprising: receiving, by processing hardware from the first base station, a conditional connection information including at least one of a (i) configuration data related to the second base station and (ii) one or more conditions for connecting to the second base station; receiving, by the processing hardware from the base station, a suspension indication indicating that the UE is to suspend the radio connection; receiving, by the processing hardware, a conditional connection indication indicating whether the UE is to release the conditional connection information; and releasing or retaining the conditional connection information in accordance with the conditional connection indication.

Aspect 30. The method of aspect 29, wherein receiving the suspension indication includes receiving a message including the conditional connection indication.

Aspect 31. The method of aspect 29, further comprising: receiving, by the processing hardware from the first base station, a resume message indicating that the UE is to resume the suspended radio connection with the first base station, the resume message including the conditional connection indication.

Aspect 32. The method of aspect 29, further comprising: receiving, by the processing hardware from a third base station, a resume message indicating that the UE is to resume the suspended radio connection with the third base station, the resume message including the conditional connection indication.

Aspect 33. A user equipment (UE) comprising processing hardware and configured to implement a method of any of aspects 16-32.

What is claimed is:

1. A method in a first base station for managing a conditional operation related to a user equipment (UE), the method comprising:
    sending, by the first base station to the UE, a conditional connection information including (i) configuration data related to a second base station in order for the UE to operate in dual connectivity with the first base station and the second base station, and (ii) one or more conditions for connecting to the second base station; and in response to determining, by the first base station, that the UE is to suspend a radio connection with the first base station:
  causing the UE to suspend a radio connection with the first base station, and
  causing the second base station to release the conditional connection information.

2. The method of claim 1, wherein causing the second base station to release the conditional connection information includes sending, to the second base station, a request to release a conditional secondary node (SN) configuration at the second base station.

3. The method of claim 1, wherein the conditional connection information relates to conditional secondary node (SN) addition.

4. The method of claim 1, wherein the conditional connection information relates to conditional primary secondary cell (PSCell) change.

5. The method of claim 1, wherein causing the UE to suspend the radio connection includes:
  sending to the UE a message associated with a protocol for controlling radio resources, the message indicating that the UE is to transition to (i) an inactive mode associated with the protocol or (ii) an idle mode associated with the protocol, with the radio connection suspended.

6. The method of claim 1, wherein causing the second base station to release the conditional connection information includes sending, to the second base station via an inter-base-station interface, an indication that the second base station is to release the conditional connection information.

7. The method of claim 6, including sending the indication in response to receiving one of (i) a request from the UE to resume the radio connection, or (ii) a request from a third base station to retrieve a context for the UE.

8. A method in a user equipment (UE) with a radio connection to a first base station for managing a conditional operation related to a second base station, the method comprising:
  receiving, by the UE from the first base station, a conditional connection information including a (i) configuration data related to the second base station in order for the UE to operate in dual connectivity with the first base station and the second base station, and (ii) one or more conditions for connecting to the second base station;
  suspending, by the UE, the radio connection in response to a triggering event; and
  releasing, by the UE, the conditional connection information in response to the triggering event.

9. The method of claim 8, wherein the conditional connection information relates to conditional secondary node (SN) addition.

10. The method of claim 8, wherein the conditional connection information relates to conditional primary secondary cell (PSCell) change.

11. The method of claim 8, further comprising:
  determining, by the UE, to resume the radio connection with a third base station;
  releasing, by the UE, the conditional connection information; and
  resuming, by the UE, the suspended radio connection with the third base station.

12. The method of claim 8, wherein the triggering event includes receiving a message omitting a field that indicates that the UE is to release the conditional connection information.

13. The method of claim 8, wherein the triggering event includes receiving a message associated with a protocol for controlling radio resources, the message indicating that the UE is to transition to (i) an inactive mode associated with the protocol or (ii) an idle mode associated with the protocol, with the radio connection suspended.

14. A base station comprising processing hardware and configured to:
  send, to a UE, a conditional connection information including (i) configuration data related to a second base station in order for the UE to operate in dual connectivity with the first base station and the second base station, and (ii) one or more conditions for connecting to the second base station; and
  in response to determining that the UE is to suspend a radio connection with the first base station:
    cause the UE to suspend a radio connection with the first base station, and
    cause the second base station to release the conditional connection information.

15. The base station of claim 14, wherein to cause the second base station to release the conditional connection information, the processing hardware is configured to send, to the second base station, a request to release a conditional secondary node (SN) configuration at the second base station.

16. The base station of claim 14, wherein the conditional connection information relates to conditional secondary node (SN) addition.

17. The base station of claim 14, wherein the conditional connection information relates to conditional primary secondary cell (PSCell) change.

18. The base station of claim 14, wherein to cause the UE to suspend the radio connection, the processing hardware is configured to:
  send to the UE a message associated with a protocol for controlling radio resources, the message indicating that the UE is to transition to (i) an inactive mode associated with the protocol or (ii) an idle mode associated with the protocol, with the radio connection suspended.

19. The base station of claim 14, wherein to cause the second base station to release the conditional connection information, the processing hardware is configured to:
  send, to the second base station via an inter-base-station interface, an indication that the second base station is to release the conditional connection information.

20. The base station of claim 14, wherein the processing hardware is further configured to:
  send the indication in response to receiving one of (i) a request from the UE to resume the radio connection, or (ii) a request from a third base station to retrieve a context for the UE.

* * * * *